United States Patent
Karni et al.

(10) Patent No.: US 9,249,690 B2
(45) Date of Patent: Feb. 2, 2016

(54) ENERGY GENERATION SYSTEM AND METHOD THEREOF

(75) Inventors: Jacob Karni, Rehovot, IL (US); Uri Garbi, Rehovot, IL (US)

(73) Assignee: YEDA RESEARCH AND DEVELOPMENT CO. LTD., Rehovot (IL)

( * ) Notice: Subject to any disclaimer, the term of this patent is extended or adjusted under 35 U.S.C. 154(b) by 210 days.

(21) Appl. No.: 13/820,825

(22) PCT Filed: Sep. 7, 2011

(86) PCT No.: PCT/IL2011/000716
§ 371 (c)(1),
(2), (4) Date: May 6, 2013

(87) PCT Pub. No.: WO2012/032516
PCT Pub. Date: Mar. 15, 2012

(65) Prior Publication Data
US 2013/0229018 A1    Sep. 5, 2013

Related U.S. Application Data

(60) Provisional application No. 61/380,451, filed on Sep. 7, 2010.

(51) Int. Cl.
*F02B 43/00* (2006.01)
*F02C 6/00* (2006.01)
(Continued)

(52) U.S. Cl.
CPC . *F01K 23/10* (2013.01); *F02C 1/00* (2013.01); *F02C 3/20* (2013.01); *F02C 3/22* (2013.01); *F02C 3/34* (2013.01); *H02K 7/18* (2013.01); *Y02E 10/46* (2013.01); *Y02E 20/16* (2013.01)

(58) Field of Classification Search
CPC ............. F01K 23/10; H02K 7/18; F02C 1/00; F02C 3/34; F02C 3/20; F02C 3/22; Y02E 10/46; Y02E 20/16
USPC ........... 60/39.12, 39.52, 39.465, 39.182, 726, 60/780, 641.8, 651, 671
See application file for complete search history.

(56) References Cited

U.S. PATENT DOCUMENTS 4,185,456 A * 1/1980 Cummings ...................... 60/780
4,811,555 A * 3/1989 Bell ................................ 60/777
(Continued)

FOREIGN PATENT DOCUMENTS

| CN | 1223355 | 7/1999 |
| EP | 0831205 | 5/2004 |

(Continued)

OTHER PUBLICATIONS

International Search Report and Written Opinion from International Application No. PCT/IL2011/000716 mailed Mar. 26, 2012.

*Primary Examiner* — Hoang Nguyen
(74) *Attorney, Agent, or Firm* — Dorsey & Whitney LLP

(57) ABSTRACT

An energy generation system and method are presented for use in operating a heat engine. The energy generation method comprises: reducing a $CO_2$ gas into CO and $O_2$ gases; reacting said CO and $O_2$ gases, thus combusting the CO gas, and yielding a substantially pure $CO_2$ outlet gas; and supplying said $CO_2$ outlet gas to the heat engine as a working gas in its heat-to-work generation process.

13 Claims, 17 Drawing Sheets

(51) Int. Cl.
*F01K 23/10* (2006.01)
*F02C 3/20* (2006.01)
*F02C 3/22* (2006.01)
*F02C 3/34* (2006.01)
*F02C 1/00* (2006.01)
*H02K 7/18* (2006.01)

(56) References Cited

U.S. PATENT DOCUMENTS

| | | | |
|---|---|---|---|
| 5,175,995 | A | 1/1993 | Pak et al. |
| 5,501,078 | A * | 3/1996 | Paolino .......................... 62/656 |
| 6,832,485 | B2 * | 12/2004 | Sugarmen et al. .............. 60/780 |
| 7,895,822 | B2 * | 3/2011 | Hoffmann et al. ............. 60/39.5 |
| 2002/0004152 | A1 | 1/2002 | Clawson et al. |
| 2002/0048545 | A1 | 4/2002 | Lewis |
| 2002/0142208 | A1 | 10/2002 | Keefer et al. |
| 2005/0241311 | A1 | 11/2005 | Pronske et al. |
| 2007/0199300 | A1 | 8/2007 | MacAdam et al. |
| 2010/0146927 | A1 | 6/2010 | McCutchen et al. |

FOREIGN PATENT DOCUMENTS

| | | |
|---|---|---|
| WO | WO 97/44574 | 11/1997 |
| WO | WO 2010/013244 | 2/2010 |

\* cited by examiner

ENERGY GENERATION SYSTEM AND METHOD THEREOF

FIELD OF THE INVENTION

This invention generally relates to an energy generation system and method thereof by using clean fuel combustion.

BACKGROUND OF THE INVENTION

One of the challenging problems facing the power generation industry is the capture of greenhouse gases produced during the combustion of fuels. More specifically, the main challenge is the capture of Carbon Dioxide ($CO_2$), since this molecular structure is the major greenhouse gas emitted during combustion.

Several technologies exist for the capture of $CO_2$. They are generally divided into the following groups: post combustion capture, oxy-fuel combustion, and pre-combustion capture.

GENERAL DESCRIPTION

In post combustion capture, the $CO_2$ is separated from the flue gas after the combustion of a fuel. This can be done in several ways, but the most common and mature technology utilizes chemical absorption by amines including primary amines such as monoethanol amine (MEA), diglycolamine (DGA); secondary amines such as diethanolamine (DEA), di-isopropylamine (DIPA); and tertiary amines such as tri-ethanolamine (TEA) and methyl-diethanolamine (MDEA). The use of chilled Ammonia has also been introduced in recent years. After the $CO_2$ is absorbed in the solvent, it is stripped and compressed, while the solvent is being regenerated. This method requires a lot of energy, and therefore imposes high costs on $CO_2$ capture.

Oxy-fuel combustion uses pure oxygen ($O_2$) instead of air for the combustion of the fuel. This method yields a $CO_2$-rich flue gas, which makes it easier to capture the $CO_2$. The downside of this technology is that the air separation units, which are used to separate $O_2$ from air, are costly and consume a lot of energy, thus reducing the efficiency of the power plant.

In pre-combustion capture, the fuel is partially oxidized prior to combustion, by reaction with $O_2$, to create syngas (a mixture of CO and hydrogen). The syngas is then shifted (via a water gas shift reaction) to yield a hydrogen and $CO_2$ rich gas. The $CO_2$ is then separated from the hydrogen, and the hydrogen is combusted releasing only water vapor. The downside of this technology is in its large equipment costs, and the energy penalty due to the partial oxidation of the fuel and the $O_2$ production.

Once the $CO_2$ is captured, it needs to be reused or sequestered to avoid its release to the atmosphere. Since the chemical and food industries consume only a small fraction of $CO_2$ produced by power plants worldwide, the rest of the $CO_2$ needs to be injected into geological formations for permanent storage. While this approach has been investigated and even demonstrated in some sites, it poses concerns regarding the long term safety of the storage. Furthermore, this approach essentially gives up the carbon in the $CO_2$, and does not recycle it. In a long term view, and given the limited amount of carbon even in coal reserves worldwide—this approach does not make optimal use of available natural resources.

There is a need in the art for a novel system and method capable of combusting fuels while recycling the reaction products without the burden of loss of efficiency and high operation costs.

The present invention presents a high efficiency power generation cycle in which obtaining a substantially pure carbon dioxide ($CO_2$) flue-stream is inherent. The technique of the invention combines oxy-fuel combustion of carbon monoxide (CO) as a fuel, with the use of $CO_2$ as a working fluid. This combustion can be performed in many heat/combustion engines such as a turbine (e.g. gas turbine) or internal combustion engine.

In this connection, it should be noted that the term "heat engine" used in this concept of the present invention refers to any engine, which converts heat to work and/or electricity. The heat can generally be derived from fuel combustion, solar radiation, geothermal energy, nuclear reaction, or any other heat source.

The generated flue gas would contain substantially pure $CO_2$, although some leaks to or from the surrounding atmosphere may occur in large scale systems without substantially altering the process. The resulting $CO_2$ volumetric fraction in the flue-gas may be from roughly 85% to greater than 99%. At least a part of the $CO_2$ can be recycled into a heat engine (e.g. a gas turbine), where it can be used as the working fluid (e.g. instead of air in a gas turbine).

Moreover, as $CO_2$ is the only combustion product of the system, it can be isolated after exiting from the engine without the significant cost typical of conventional $CO_2$ capture solutions.

According to the invention, at least a portion of the $CO_2$ exiting the heat engine is recycled to CO and $O_2$. This can be done in several ways, such as thermo-chemical and/or catalytic processes and/or electrochemical reduction of $CO_2$ in a gas phase, photo-catalytic methods, or by electrolysis. The reduction of $CO_2$ into CO and $O_2$ provides the required $O_2$ for oxy-fuel combustion, without the need for an Air Separation Unit (ASU). An auxiliary ASU can still be integrated into the system of the present invention as a source of $O_2$ makeup due to losses in the system, or separation of ambience gases (e.g. nitrogen), which may leak into the system.

The system of the present invention can use any known reduction techniques of $CO_2$. For example, such electrochemical reduction techniques include the technique developed by one of the inventors of the present application and described in the international application number PCT/IL2009000743 incorporated herein by reference. Various other methods for dissociation of $CO_2$, using photoelectric, catalytic, electrolytic, and thermo-chemical processes may also be used.

According to some embodiments of the technique described in PCT/IL2009000743, the reduction of $CO_2$ into CO and $O_2$ utilizes an electron source including a thermionic cathode or photocathode and an anode and configured and operable to emit electrons, and an electric field generator for generating an electric field having an energy sufficient to dissociate reactant gas molecules ($CO_2$ and/or $H_2O$). The cathode and anode are spaced apart from one another at a predetermined distance defining a reaction gas chamber configured and operable to cause interaction between the electrons with the reactant gas molecules via a dissociative electrons attachment (DEA) mechanism within the chamber. Electrons having the required energy dissociate the molecules into product compounds ($O_2$, and CO and/or $H_2$). Considering the use of a thermionic cathode, the system includes a thermal energy source configured and operable to supply thermal energy to the electron source thereby raising electron source temperature and generating thermionic electrons emission from the thermionic cathode. The thermionic cathode may be associated with said electric field generator or a separate electric field generator operable to apply an electric potential between the cathode and anode, reducing the potential barrier of the cathode and enhancing a number of emitted electrons. The thermionic cathode may be formed with a protective coating, to be protected from exposure to gaseous environment including $CO_2$, CO, O⁻ and $O_2$. The protective coating may include an oxide layer. The protective coating may be configured to enable electron transmission via tunneling by reducing the work function of the cathode.

There is thus provided, according to one broad aspect of the invention, an energy generation system (power producing engine or plant) for use in operating a heat engine. The system comprises: a reduction unit energized by an external energy source and being configured and operable for reducing $CO_2$ into CO and $O_2$, said $CO_2$ reduction unit having a gas inlet associated with a gas outlet of the heat engine for inputting $CO_2$, and having CO and $O_2$ gas outlets; and a combustor comprising a plurality of gas inlets including gas inlets connected to the outlets of said reduction unit for receiving the CO and $O_2$ gases, and a gas inlet for receiving a $CO_2$ working fluid, and a gas outlet connectable to a gas inlet of the heat engine, said combustor being configured and operable to cause a reaction between said CO and $O_2$ gases thereby combusting the CO gas to form $CO_2$ gas, and for supplying, through said gas outlet, a substantially pure $CO_2$ gas to drive the heat engine, the system thereby providing operation of the heat engine driven by said external energy source via the reduction of $CO_2$.

The heat engine may comprise at least one of a gas turbine, a steam turbine, and an internal combustion engine.

In some embodiments, the combustor further comprises an additional inlet associated with the gas outlet of the heat engine and configured for receiving at least a portion of $CO_2$ exhausted by the heat engine.

Preferably, the system includes one or more compressors connected to the one or more inlets of the combustor and configured and operable to compress $CO_2$ and to supply at least a portion of the compressed $CO_2$ to the combustor. The compressor may also be connected to the gas inlet of the heat engine, the compressor being configured and operable to introduce at least a portion of the compressed $CO_2$ into the heat engine.

The system may include an additional (second) compressor, connected to the gas inlet of the $CO_2$ reduction unit, and configured for compressing $CO_2$ exhausted by the heat engine and supplying at least a portion of the compressed $CO_2$ to the $CO_2$ reduction unit.

In some embodiments, the system includes an electric generator connected to the heat engine. The electric generator is configured and operable to convert work produced by the heat engine into electrical power.

An electric generator may be used with the compressor to provide power required for circulating working fluid in a closed-loop cycle.

In some embodiments, the system comprises a mixing chamber interconnected between the outlet of the $CO_2$ reduction unit and the inlet of the combustor. The mixing chamber is configured and operable to receive $O_2$ and CO and provide mixture of CO and $O_2$ to the combustor.

In some embodiments, the system is configured as a combined cycle comprising more than one thermodynamic cycle. The combined cycle may comprise a first cycle and a second cycle, where the first cycle comprises a heat engine and the second cycle comprises a Rankine turbine. The second cycle may comprise a heat recovery unit (HRU) connected to the heat engine outlet and having at least one $CO_2$ inlet and one $CO_2$ outlet. The HRU is configured and operable for transferring at least some heat from $CO_2$ exhausted by the heat engine to a fluid circulating in the second cycle. The HRU may comprise a steam generator utilizing heat of the $CO_2$ exhaust gas to transform water into steam or to heat steam, and at least one steam turbine connected to the outlet of the steam generator. The at least one steam turbine may be connected to a second electric generator driven by the steam turbine.

In some embodiments, the reduction unit is configured and operable for reducing a mixture of $CO_2$ and water or steam into $O_2$ and syngas (a mixture of CO and $H_2$), the combustor is configured and operable for reaction between syngas and $O_2$ yielding the mixture of $CO_2$ and water-steam, and the heat engine is driven by the gas output from the combustor comprising the mixture of $CO_2$ and water-steam.

In some embodiments, the second cycle comprises a condenser configured and operable to condense exhaust steam from the steam turbine to produce condensed water. The system may include an intercooled compressor connected to and driven by the steam turbine, the intercooled compressor being configured and operable for compressing fluid exhausted by the heat engine and directed to the combustor or to the steam engine by cooling the fluid and via a heat exchange with at least a portion of water produced in the condenser.

The system may utilize external energy source comprising a solar receiver connected to the reduction unit, which comprises a solar energy driven $CO_2$ dissociation reactor.

The system may comprise a solar receiver connected to the additional inlet of the combustor and configured and operable to preheat fluid traversing the additional inlet prior to feeding the fluid into the combustor.

The system may comprise a solar receiver connected to at least the additional inlet of the combustor and the gas outlet of the combustor. The solar receiver is configured and operable to heat fluid in parallel to the combustor or upstream of the combustor. The system may comprise a flow controller placed upstream of the solar receiver. The flow controller is configured and operable to determine flow portions to be directed to either the solar receiver or the combustor, when the solar receiver is placed in parallel to the combustor. The solar receiver may be connected to outlet of a primary compressor associated with the combustor, the solar receiver being configured and operable to heat compressed fluid leaving the primary compressor.

In some embodiments, the reduction unit comprises: a buffer storage module for receiving from the HRU, the fluid being $CO_2$ or said mixture of $CO_2$ and steam or water; a reduction reactor configured and operable to receive the fluid from the buffer storage module and to reduce $CO_2$ into CO and $O_2$ or the mixture of $CO_2$ and steam or water into syngas and $O_2$; a flow regulator regulating the fluid flow from said buffer storage module to said reduction reactor; and first and second compressors, the first compressor being configured and operable to compress CO or syngas leaving said reduction reactor and to supply compressed CO or syngas to said combustor, the second compressor being configured and operable to compress $O_2$ leaving said reduction reactor and to supply compressed $O_2$ to said combustor. The buffer storage module may receive $CO_2$ or a mixture of $CO_2$ and water or steam from an external source.

According to another broad aspect of the invention, there is provided a system for operating a steam cycle powering a steam turbine, the system comprising:

a reduction unit energized by an external energy source and being configured and operable for reducing CO2 into CO and O2, said reduction unit having a gas inlet configured for receiving CO2, and having CO and O2 gas outlets;

a combustor having a first gas inlet configured for receiving CO from said reduction unit, a second gas inlet configured for receiving O2 from said reduction unit, and a gas outlet associated with the gas inlet of the reduction unit, the combustor being configured and operable for a reaction between said CO and O2 gases, thereby combusting the CO gas to form CO2 gas, and for supplying a substantially pure CO2 flue gas to said reduction unit;

a heat recovery unit (HRU) connected to the outlet of the combustor, the HRU comprising at least one inlet and one outlet, and being configured and operable for transferring at least some heat from said CO2 produced in said combustor to water and/or steam circulating in the steam cycle, thereby powering the steam cycle and driving the steam turbine.

The reduction unit may comprise a reduction of a mixture of $CO_2$ and water or steam into $O_2$ and syngas (a mixture of CO and $H_2$). The reaction in the combustor may comprise a reaction between syngas and $O_2$ yielding said mixture of $CO_2$ and water or steam.

According to yet another aspect of the invention, there is provided a power plant for generating electricity, comprising:

a steam cycle comprising a steam turbine having an inlet for receiving high-temperature steam and an outlet for exhausting stream and/or water having lower temperature and pressure than the high-temperature steam, the steam turbine being powered by passage of steam therethrough;

the above described system for transferring at least some heat from said combustor's exhaust to said water and/or steam exhausted by said steam turbine, thereby powering said steam cycle and driving the steam turbine; and an electric generator associated with said steam turbine and configured for using work generated by said steam turbine to generate electricity.

The power plant may further comprise a fuel combustor for combusting a fuel in air and transferring at least some heat from at least one combustion product of said combustion in air to said water and/or steam before it enters said steam turbine. The fuel may comprise coal or natural gas.

According to yet further aspect of the invention, there is provided a method for use in operating a heat engine, the method comprising:

(a) reducing a $CO_2$ gas into CO and $O_2$ gases;
(b) reacting said CO and $O_2$ gases, thus combusting the CO gas, and yielding a substantially pure $CO_2$ outlet gas;
(c) supplying said $CO_2$ outlet gas to the heat engine as a working gas in its heat-to-work generation process.

The $CO_2$ gas exhausted by the heat engine may be further directed to reduction unit for further reduction; and the preceding steps may be repeated, therefore generating a closed-loop cycle of the heat engine operation by reusing the $CO_2$ exhausted from the heat engine to produce CO and $O_2$.

At least a part of $CO_2$ gas exhausted from the heat engine may be combusted for use as a working fluid in the cycle.

Reduction of $CO_2$ into CO and $O_2$ may be performed using solar energy.

Reducing of $CO_2$ into CO and $O_2$ may be performed by using additional $CO_2$ gas supplied from an external source.

The method may comprise generation of electrical power by using work generated by the heat engine to drive an electric generator connected to the heat engine.

CO may be mixed with $O_2$ prior to the combustion to produce a mixture of CO and $O_2$.

Heat from said $CO_2$ gas exhausted from the heat engine may be recovered. Heat from the CO2 exhaust gas may be used to heat steam or transform water to steam. The steam may be used to drive at least one steam turbine. Work produced in said steam turbine may be used for generating electric power. Steam may be recycled in a Rankine cycle powered by the heat from said $CO_2$ exhaust gas.

$CO_2$ may be compressed and at least a part of said compressed $CO_2$ may be used as working fluid in the combustion. At least one compressor may be driven by using said heat engine and at least a part of said compressed $CO_2$ may be supplied to the heat engine.

At least a part of the $CO_2$ gas exhausted by the heat engine may be directed to the $CO_2$ (or $CO_2$ and water) reduction unit for reduction of $CO_2$ or $CO_2$ and water.

A mixture of $CO_2$ and water or steam may be reduced to syngas (a mixture of CO and $H_2$) and separated $O_2$. Syngas reacts with $O_2$ yielding a mixture of $CO_2$ and water. The mixture of $CO_2$ and water or steam is supplied to the heat engine. The mixture of $CO_2$ and water or steam exhausted from the heat engine is directed to the reduction unit for further reduction.

According to yet another broad aspect of the invention, there is provided a method for use in operating a steam cycle powering a steam turbine, comprising:

(a) reducing a $CO_2$ gas into CO and $O_2$ gases;
(b) reacting said CO and $O_2$ gases, thus combusting the CO gas and yielding a substantially pure $CO_2$ outlet gas;
(c) directing said $CO_2$ outlet gas to a heat recovery unit (HRU) for transferring at least some heat of said outlet gas to power the steam turbine and (d) enabling further reduction of $CO_2$ exhausted from said HRU into CO and $O_2$ gases and then combustion of the CO gas, hence operating in a close loop.

According to yet further broad aspect of the invention, there is provided a power plant for generating electricity, comprising:

a steam cycle comprising a steam turbine having an inlet for receiving high-temperature steam and an outlet for exhausting stream and/or water having lower pressure and temperature than the high-temperature steam, the steam turbine being powered by passage of steam therethrough;

a first fuel combustor, configured for performing an oxy-fuel combustion of a carbon-based fuel and yielding an exhaust gas being mixture of CO2 and water or steam, said first fuel combustor having a fuel intake for receiving said fuel from an external source, an oxygen intake, for receiving oxygen, and an outlet from exhausting said exhaust gas;

a heat recovery unit (HRU), configured for transferring at least some heat from said combustor's exhaust gas to said water and/or steam exhausted by said steam turbine, thereby powering said steam cycle and driving the steam turbine;

a reduction unit, configured for receiving said combustor's exhaust gas leaving the HRU and reducing said mixture of CO2 and water or steam into syngas (a mixture of CO and H2) and O2, said reduction unit having an oxygen outlet for reintroducing said O2 into the said first fuel combustor, and a syngas outlet for exhausting said syngas;

a syngas storage unit, for receiving and storing said syngas exhausted by said reduction unit; and an electric generator associated with said steam turbine and configured for using work generated by said steam turbine to generate electricity for use in an electric grid.

The power plant may include a second fuel combustor for combusting a second fuel in air, and a second HRU for transferring at least some heat from at least one combustion product of said combustion in air to said water and/or steam exhausted by said steam turbine. At least one of the first and second fuels may comprise coal or natural gas.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF THE INVENTION

Figure 1A:
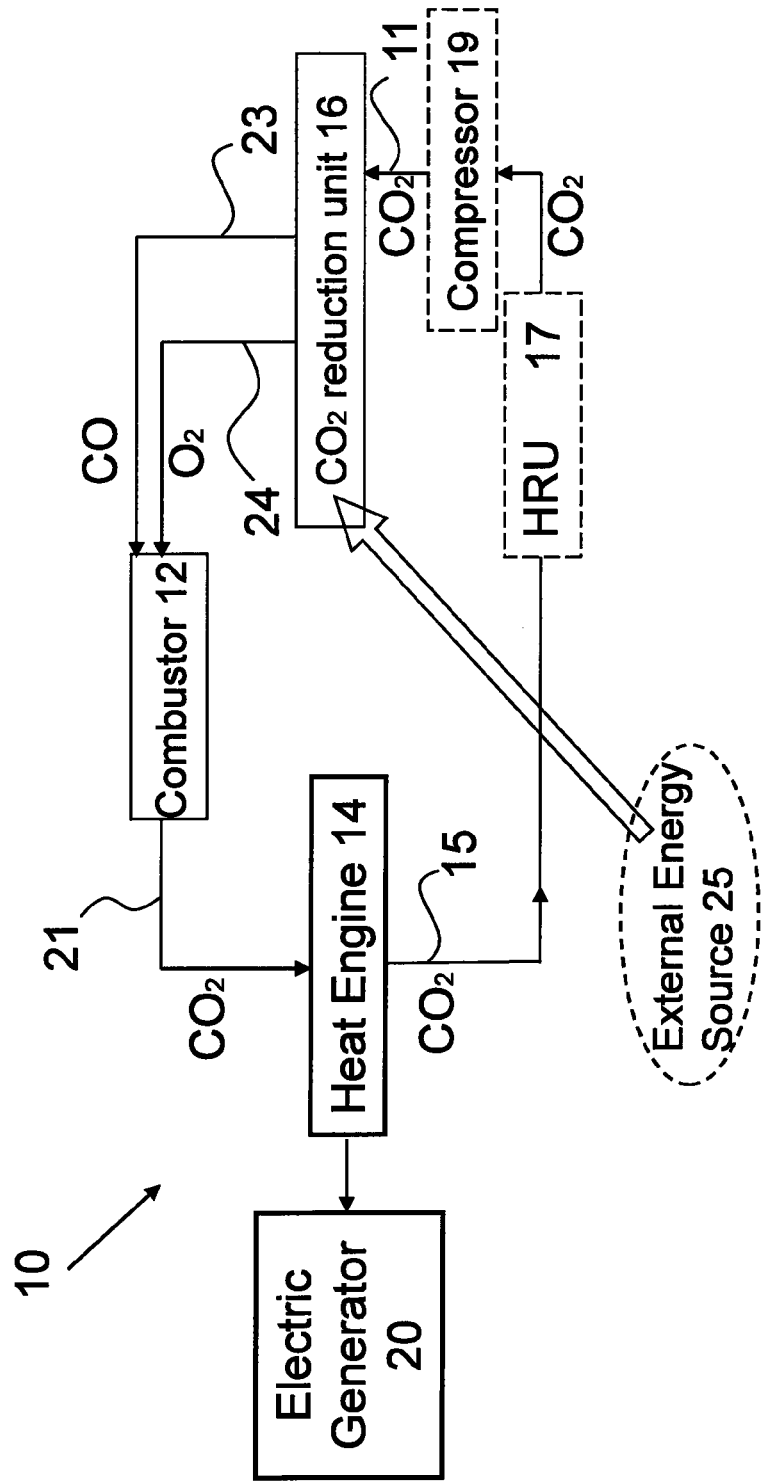
FIGS. 1A-1D are general schematic block diagrams showing examples of how systems based on the present invention can operate a heat engine, and different configurations thereof, in which CO is used as combustion fuel and $CO_2$ is the working gas.

Reference is made to FIG. 1A illustrating a general block diagram of an energy generation system 10 of the present invention. The system 10 is configured to operate a heat engine 14, and comprises a $CO_2$ reduction unit 16 energized by an external energy source 25 (e.g. solar or nuclear energy), and a combustor 12. The reduction unit 16 is configured for reducing $CO_2$ to CO and $O_2$, and includes a gas inlet 11 for inputting $CO_2$, a CO gas outlet 23, and an $O_2$ gas outlet 24. The combustor 12 is configured for effecting an oxy-fuel combustion of CO, and has gas inlets connected to the outlets 23 and 24 of the $CO_2$ reduction unit 16 for receiving the CO and $O_2$ gases, and a gas ($CO_2$) outlet 21 connectable to a gas inlet of the heat engine 14. The $CO_2$ leaving the combustor 12 has a certain heat because of the exothermal combustion of CO. Such heated $CO_2$ is introduced into the heat engine 14, where the heat is converted into work, for example in the form of rotational mechanical energy. $CO_2$ then leaves the heat engine 14 via a gas outlet 15 and may then be compressed by compressor 19 before entering the gas inlet 11 of the reduction unit 16. Thus, in this configuration, a closed-loop operation of the heat engine 14 is provided, driven by an energy input via the reduction of $CO_2$.

The combustor 12 is configured and operable to combust CO by reacting CO with $O_2$ and thereby producing a stream of a $CO_2$ working fluid. The stream exiting the combustor 16 via the outlet 21 is a substantially pure $CO_2$ gas. Therefore, substantially pure $CO_2$ gas is used as a working fluid in the heat engine 14. Typically, if the heat engine 14 is a gas turbine, the desirable operating temperatures of the working fluid coming out of the combustor 12 are between 800° C. and 1400° C.

In some embodiments, the heat engine is connected to an electric generator 20 being configured and operable to convert work produced by the heat engine into electrical power.

In some embodiments, an electric generator (being the electric generator 20 connected to the heat engine or a different element) is connectable to compressor 19. The compressor 19 is driven by electric generator(s) thereby providing the power required for circulating the fluids in a closed-loop system.

In some embodiments, the system is configured as a combined cycle comprising more than one thermodynamic cycle. The combined cycle may comprise an upper cycle comprising the heat engine 14 and a lower cycle comprising a heat recovery unit (HRU) 17. In this case, the $CO_2$ from the heat engine outlet 15 is introduced into the HRU 17 in which the residue heat from the $CO_2$ exhaust gas is used to generate steam as will be described in details further below. $CO_2$ gas leaving the heat engine 14 is introduced into the HRU 17 from the outlet 15 of heat engine 14, and exhausted from HRU 17 into compressor 19, which recycles the $CO_2$ in the system.

The system and method of the present invention thus provide a low cost, high efficiency cycle that can be used on a large scale for energy generation without adding $CO_2$ to the environment. The process involves the use of $CO_2$ as working fluid, and combustion of CO and $O_2$, while diverting the effluent gas made mostly of $CO_2$ (i.e. the $CO_2$ volumetric fraction may be in the range of about 80-90% to greater than 99%) for sequestration or recycling into fuel.

The technique of the invention uses oxy-fuel combustion of oxygen generated in the process with a specific choice of fuel (CO) also generated in the process.

While CO is a poisonous gas, it is widely used as a process gas in many industrial processes, usually by its in-situ usage, in close proximity to its generation. The system and method of the present invention utilize a clean recycling process of $CO_2$ in which CO and $O_2$ are produced using a clean energy source (e.g. solar energy), in order to generate energy in the form of heat and/or electricity, without the added operational costs and energy intensiveness associated with generating $O_2$ via air separation.

Figure 1B:
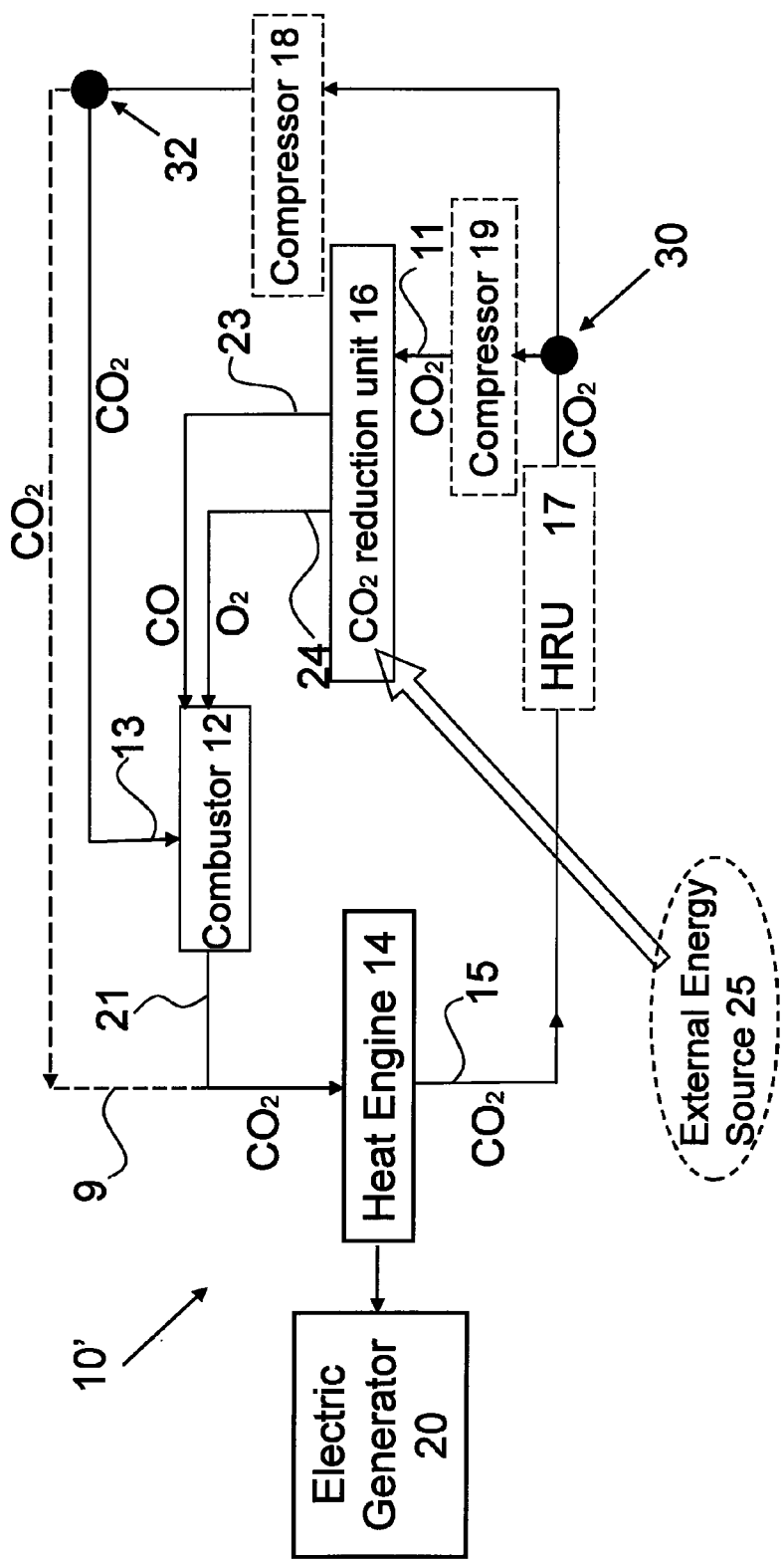

Reference is now made to FIG. 1B, illustrating a non-limiting embodiment of the energy generation system 10 of FIG. 1A. The system 10' illustrated in FIG. 1B is generally similar to that of FIG. 1A, but includes some additional elements. In the example of FIG. 1B, the exhaust $CO_2$ leaving the heat engine 14 through outlet 15 (and possibly passing through HRU 17) is divided into two portions at node 30. The first portion is introduced into the reduction unit 16 (e.g. after passing the compressor 19) via the inlet 11, as explained above, while the second portion is driven directly into the combustor 12 via gas inlet 13. The $CO_2$ reaching the combustor 12 via the gas inlet 13 is used for cooling the walls of the combustor 12 to a desirable operating temperature and is then mixed with, the $CO_2$ produced by the combustion of CO and $O_2$. Upon leaving combustor 12 it enters heat engine 14 at a temperature suitable for operation of the heat engine 14.

Optionally, the second portion of the heat engine's exhaust $CO_2$ is further divided into two streams at node 32: a first stream is directed to the combustor 12 via the gas inlet 13 as explained above, and a second stream is directed to the heat engine 14 via a conduit 9. If present, the $CO_2$ stream to the heat engine 14 travelling via conduit 9 is also used to lower the temperature of the $CO_2$ supplied to the heat engine 14 by combustor 12.

The system 10 may also comprise a primary compressor 18 connected to the combustor 12 via a $CO_2$ inlet 13 and may be configured and operable to generate compressed $CO_2$ with a required pressure being in the range of about 4 to about 40 Bar. The primary compressor 18 may supply at least a portion of the compressed $CO_2$ to the combustor 12. Optionally, the compressor 18 is powered by an electric generator (being the electric generator 20 connected to the heat engine or a different element).

In some embodiments, the primary compressor 18 is connected to both, the $CO_2$ inlet 13 of the combustor 12 and the heat engine inlet 21 as represented by dashed lines. In this case, the primary compressor 18 supplies a part of the compressed $CO_2$ to the combustor 12 and a part of the compressed $CO_2$ directly to the heat engine 14. By controlling the operation of the compressor 18 and/or the secondary compressor 19, the flow of $CO_2$ exhausted by the heat engine 14 to the reduction unit 16 and to the combustor 12, is regulated, enabling control of the temperature and pressure of the $CO_2$ working gas entering the engine 14.

In some embodiments, the extent of the first and second portions of the $CO_2$ flow divided at node 30 and of the first and second streams divided at node 32 may be controlled by the operation of the compressors 18 and 19. Optionally or alternatively, two-way valves may be present at one or both nodes 30 and 32 for providing further control of the extent of the first and second portions of the $CO_2$ flow divided at node 30 and of the first and second streams divided at node 32.

As explained above, the regulation of the first and second portions and of the first and second streams enables control of the temperature and pressure of the $CO_2$ working gas entering the engine 14. This regulation may be manual or automatic. If the regulation is automatic, the system 10 includes a control unit (not shown in the figure), temperature sensors (not pictured) and pressure sensors (not pictured). The temperature and pressure sensors are set, for example, at the outlet of the combustor 12 and at the inlet 21 of the heat engine 14, and are respectively configured for measuring a temperature and a pressure of the $CO_2$ leaving the combustor 12 and entering the heat engine 14.

It should be noted although not specifically illustrated that the control unit is typically a computer system which includes inter alia such constructional part as: an input port connected to the temperature and pressure sensors and configured for receiving therefrom the data indicative of the temperature and pressure of the $CO_2$ leaving the combustor 12 or entering the heat engine 14; a memory utility; a processing utility configured for processing and analyzing measured temperature and pressure data by applying thereto an appropriate algorithm to determine a relation between the measured temperature and pressure values and the desired ones (or desired temperature and pressure ranges), for calculating the extent of the first and second portions and of the first and second streams needed for providing that $CO_2$ leaves the combustor at the desired temperature (or within the desired temperature range) and the desired pressure (or within the desired pressure range), and for generating control data indicative of the results. Also, the control system includes controllers configured for receiving the control signal/data from the processing unit and manipulating the compressors 18 and 19, and the valves at nodes 30 and 32 accordingly (if present), in order to effect the appropriate flow separations at nodes 30 and 32.

Figure 1C:
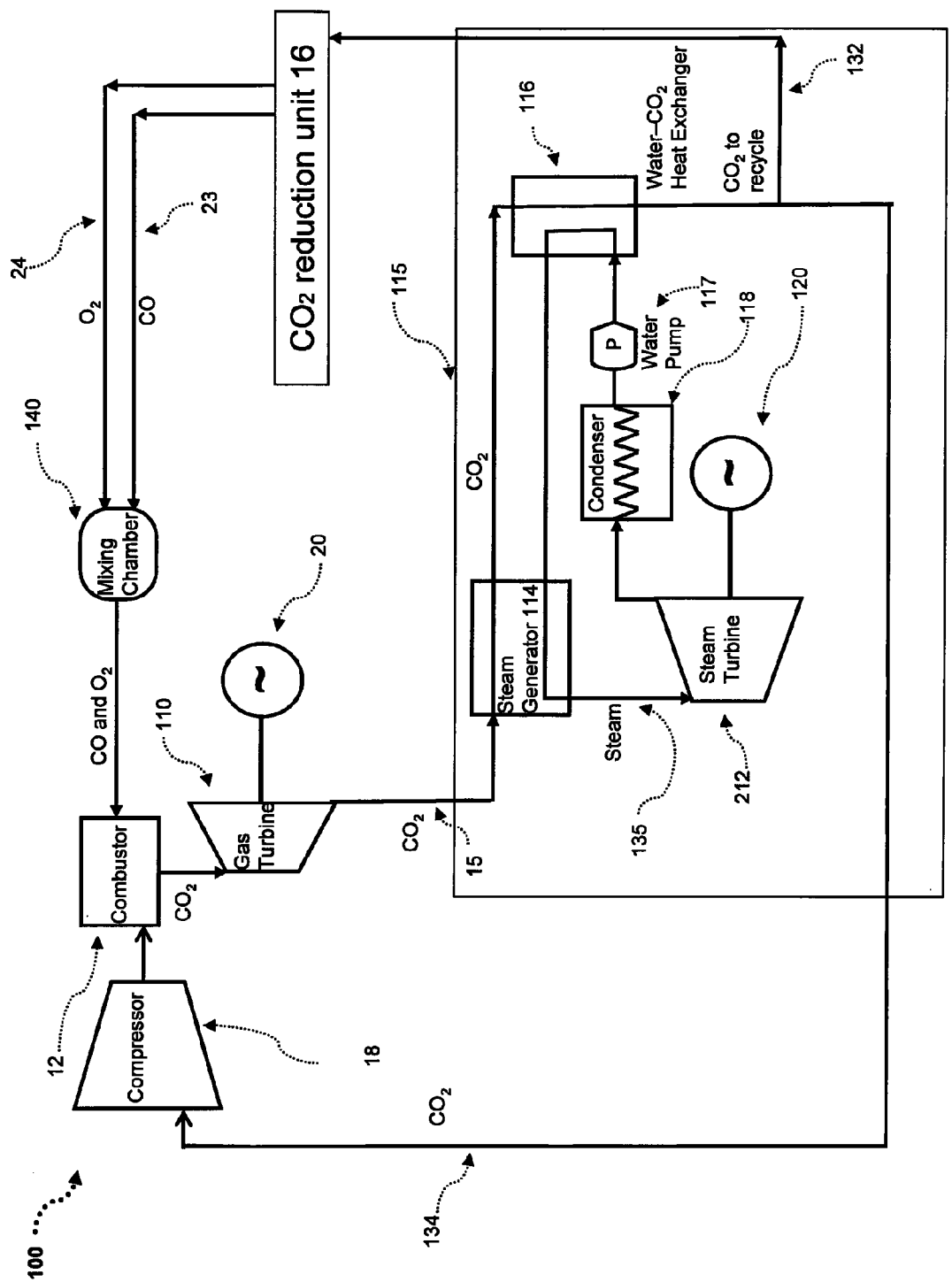

Reference is made to FIG. 1C illustrating a schematic block diagram of a non-limiting example of a system 100 of the present invention for use in clean electrical power generation. The system 100 is configured and operable to combust CO with $O_2$, and to provide substantially pure $CO_2$ as a reaction product. This reaction product is ready for sequestration without further purification.

In some embodiments, the system 100 includes a mixing chamber 140 placed in between the $CO_2$ reduction unit 16 and the combustor 12. The mixing chamber 140 is configured and operable to receive $O_2$ and CO from respective outlets 24 and 23 of the reduction unit 16, and to provide a mixture of CO and $O_2$ to the combustor 12. The $O_2$ and CO may therefore be mixed before entering the combustor 12. It should be noted that the mixing may be performed directly in combustor 12 in which the CO and $O_2$ are combusted together, producing $CO_2$, which is then mixed with the compressed $CO_2$ from compressor 18, producing a hot stream of $CO_2$ (having typical temperatures in the range of about 800° C.-1400° C.).

In this configuration, the system 100 comprises a combined cycle having an upper cycle including a gas turbine 110 (corresponding to the heat engine 14 of FIGS. 1A-1B) and a lower cycle 115 including a steam-Rankine turbine 212. The hot, compressed stream of $CO_2$ exiting the combustor 12 operates the turbine 110, which drives an electric generator 20, which produces electricity. The $CO_2$ from the gas turbine outlet 15 is introduced into the steam Rankine bottoming cycle 115, comprising a heat recovery unit (HRU) for transferring residue heat from the turbine 110 to another medium such as water/steam. The compressor 18 is fed by a portion or all of the $CO_2$ outputted by the HRU.

In this specific example, the HRU comprises a steam generator 114, utilizing the heat of the $CO_2$ to generate steam 135, and optionally further includes a $CO_2$-water heat exchanger 116. The steam generated and possibly also superheated in steam generator 114 is used to power the steam turbine 212, which drives an electric generator 120 and produces electricity. The exhaust steam from the turbine 212 is condensed in condenser 118 and pumped via a pump 117 (e.g. water pump) into a heat exchanger 116. The waste heat from the $CO_2$ coming out of the steam generator 114 is used to heat the pumped water in the water-$CO_2$ heat exchanger 116. At least a part of the $CO_2$ 134 coming out of the heat exchanger 116 is introduced into compressor 18 as the working fluid for the fuel combustion. A portion of the HRU $CO_2$ output 132 is recycled in the $CO_2$ reduction unit 16.

Figure 1D:
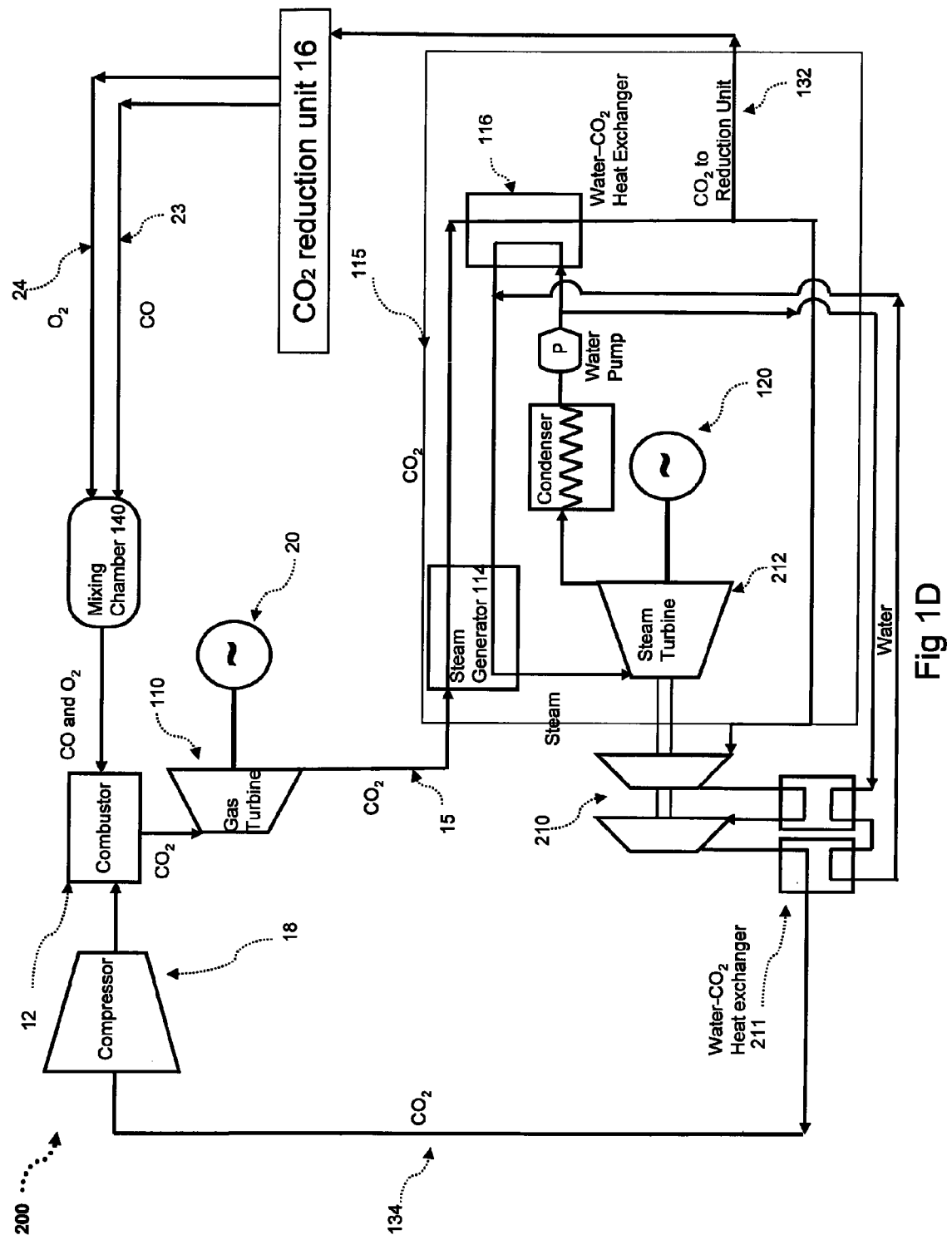

Reference is made to FIG. 1D illustrating a schematic block diagram of another configuration of a part of the energy generation system, generally designated 200. System 200 is generally similar to the above-described system 100 of FIG. 1C, but differs from it by the addition of an intercooled $CO_2$ compressor 210 connected to and driven by a steam turbine 212. A heat exchanger 211 cools the $CO_2$ and preheats water prior to its introduction into the steam generator 114 using the waste heat generated during the $CO_2$ compression in 210. It assists heat exchanger 116, while improving the efficiency of Compressor 210. The intercooled $CO_2$ compressor 210 is intercooled by using at least a part of the condensed water of the steam turbine cycle. The intercooled $CO_2$ compressor 210 is configured and operable to produced compressed $CO_2$.

Figure 2A:
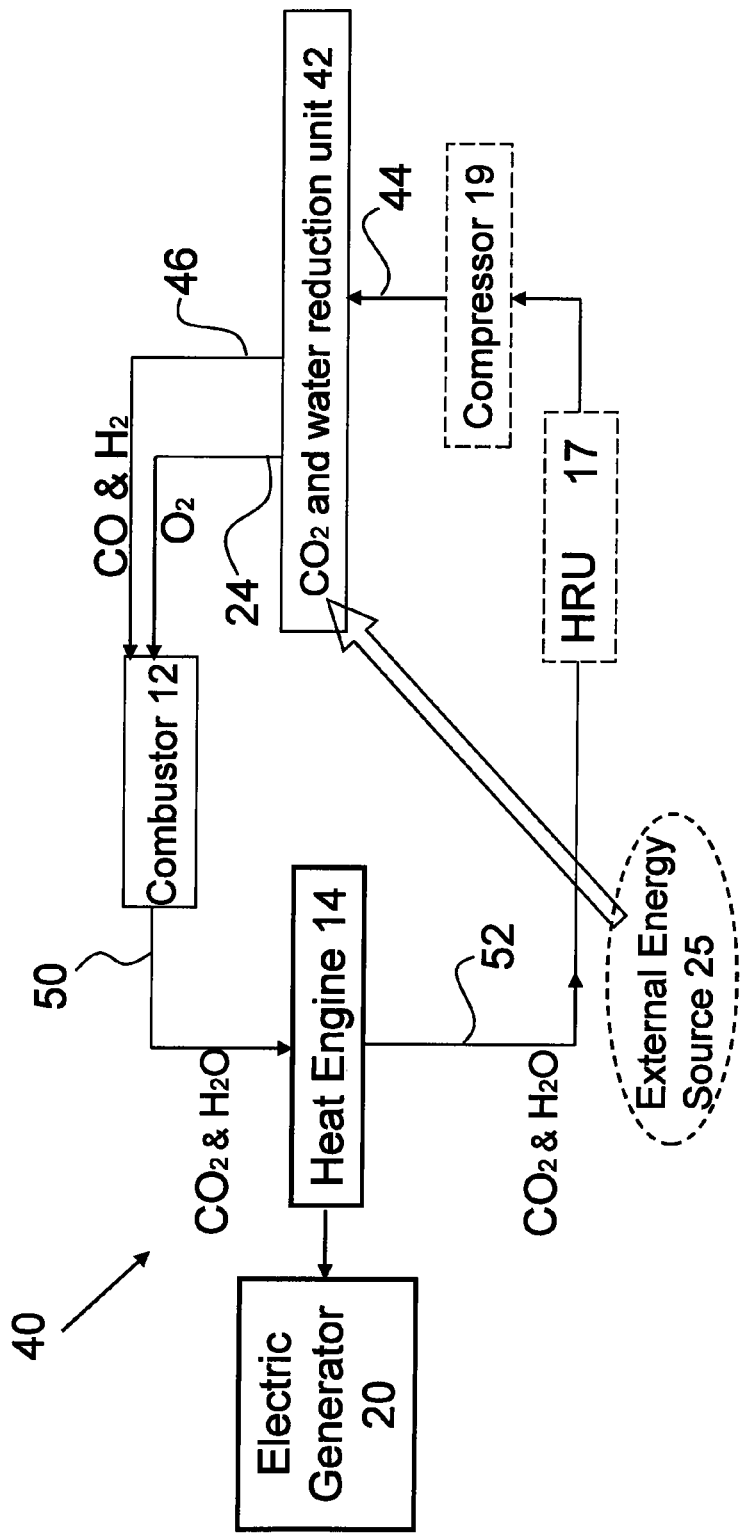
FIGS. 2A-2C schematically illustrate block diagrams of examples of systems of the present invention for operating a heat engine, and different configurations thereof, in which Syngas (a mixture of CO and $H_2$) is used as a combustion fuel, while a mixture of $CO_2$ and water is used as a working gas.

Reference is now made to FIG. 2A, illustrating a schematic block diagram of a non-limiting example of the present invention, according to which an energy generation system 40 is provided for operating a heat engine 14, by using Syngas (a mixture of CO and $H_2$) as combustion fuel, and a mixture of $CO_2$ and water (in gaseous form) as a working gas. The energy generation system 40 includes a $CO_2$-and-water reduction unit 42 energized by an external energy source 25 (e.g. solar or nuclear energy), and a combustor 12.

The reduction unit 42 is configured for reducing a mixture of $CO_2$ and water to $O_2$ and mixture of CO and $H_2$ (Syngas), and therefore includes a gas inlet 44 for inputting the $CO_2$ and water mixture into the reduction unit, a syngas gas outlet 46, and an $O_2$ gas outlet 24. The combustor 12 is configured for effecting an oxy-fuel combustion of Syngas, and has gas inlets connected to the outlets 46 and 24 of the reduction unit 42 for receiving the $O_2$ and the Syngas, and a gas ($CO_2$-and-water mixture) outlet 50 connectable to a gas inlet of the heat engine 14. The $CO_2$-and-water mixture leaving the combustor 12 is heated because of the exothermal combustion of the Syngas. Such heated $CO_2$-and-water mixture is introduced into the heat engine 14, where part of the heat is converted into work, for example in the form of rotational mechanical energy and/or electricity. Exhaust $CO_2$-and-water mixture then leaves the heat engine 14 via a gas outlet 52, which is connected to the gas inlet 44 of the reduction unit 42. Thus, in the system 40 the heat engine 14 is connected to the gas inlet 44 of the reduction unit 42 and the gas outlet 50 of the combustor 12, to thereby provide a closed-loop operation of the heat engine 14, driven by an external energy input from energy source 25 into the reduction unit of $CO_2$ and water. The heat engine 14 may operate an electric generator 20 to produce electricity.

Like the system 10 of FIGS. 1A-1B, the system 40 may be associated with a lower cycle comprising an HRU 17, and may include a compressor 19 for circulating fluids in the closed-loop system. Furthermore the system 40 may include ducts and at least one compressor to drive some of the $CO_2$-and-water mixture exhausted from the combustor 42 into the heat engine 14.

Figure 2B:
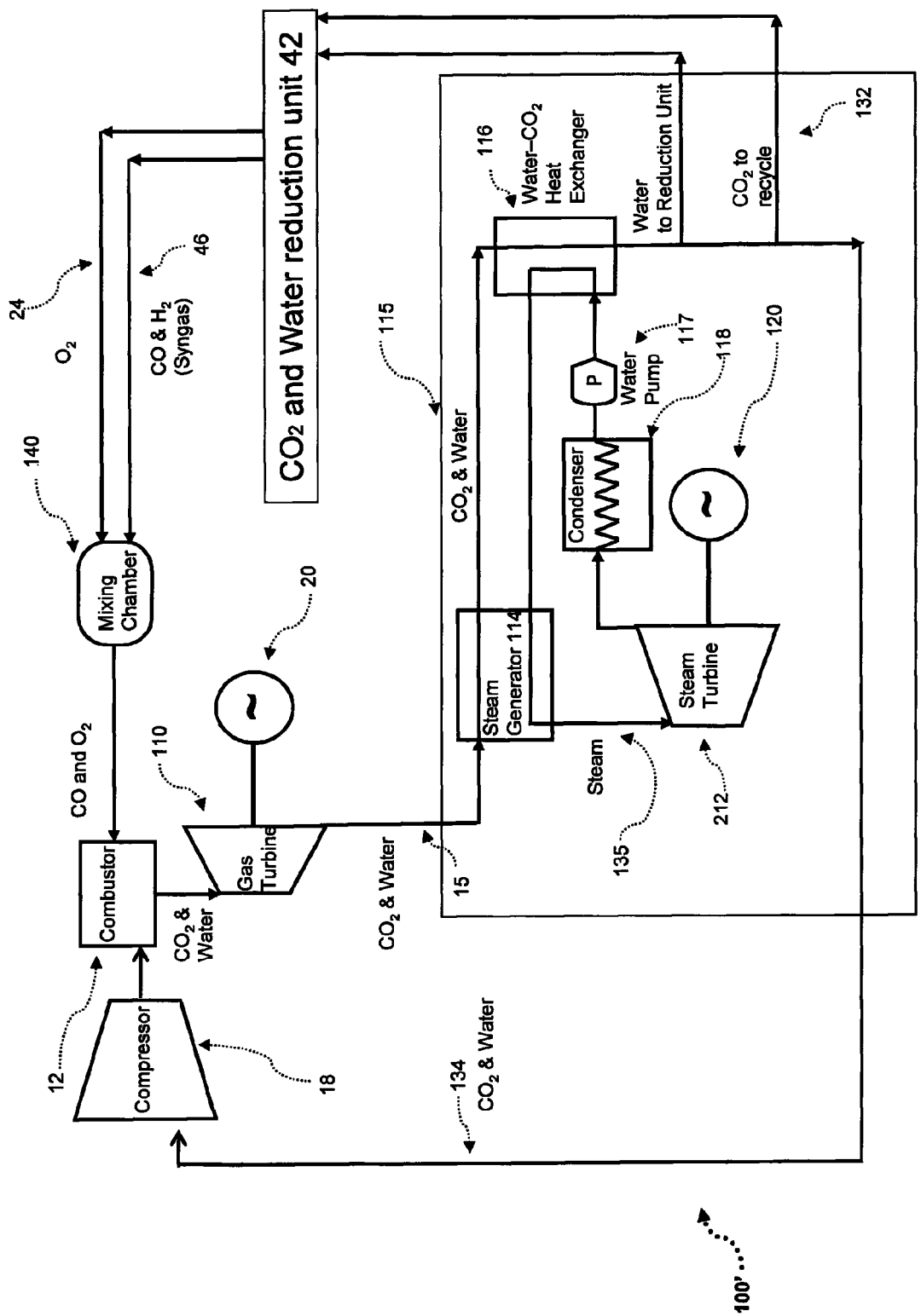

Reference is made to FIG. 2B illustrating a system 100', being a specific but not limiting example of the configuration of system 40 of FIG. 2A. The system 100' generates clean electrical power by circulating working fluid containing water vapor in addition to $CO_2$. The volumetric portion of the water may vary from a few percents to roughly 50%. The working fluid containing water vapor in addition to $CO_2$ is then introduced into the combustor 12. The combustion product operates the gas turbine 110 (corresponding to the heat engine 14 of FIGS. 1A-1B and of FIG. 2A), which rotates and operates an electric generator 20 and produces electricity. The gas turbine outlet 15 exhausts a mixture of $CO_2$ and steam which are introduced into a steam Rankine bottoming cycle 115, comprising a steam generator/heat recovery unit (HRU) 114 for transferring residue heat from the turbine 110 to another medium such as water/steam. In the steam Rankine bottoming cycle 115 the heat of the mixture of $CO_2$ and steam is used to generate and possibly also superheat steam in the steam generator 114. The bottoming cycle 115 comprises a steam turbine 212 fed by steam 135. The steam turbine 212 drives an electric generator 120, which produces electricity. The exhaust steam from the turbine 212 is condensed in condenser 118, pumped via a pump 117 and optionally introduced into a heat exchanger 116. The waste heat from the $CO_2$-and-water mixture coming out of the steam generator 114 is used to preheat the pumped water in the water-$CO_2$ heat exchanger 116. The water in a portion 132 of the steam Rankine bottoming cycle $CO_2$-and-water output is separated from the exhaust gases—mostly $CO_2$ and steam, and is introduced in the $CO_2$-and-water reduction unit 42. The recycling process can then include both, $CO_2$ dissociation to CO and $O_2$, as well as water dissociation to $H_2$ and $O_2$. In this case, a mixture of CO and $H_2$ (syngas), is introduced into the mixing chamber 140 via the reduction unit's outlet 46, while $O_2$ is introduced into the mixing chamber 140 via the reduction unit's outlet 24. Therefore, the syngas can be used as the fuel in the engine by being introduced into the combustor 12, where it is combusted with the $O_2$ generated in the dissociation of $CO_2$ and water. Another part of the mixture of $CO_2$ and steam 134' coming out of the heat exchanger 116 may be introduced back into the compressor 18 serving as working fluid in the fuel combustor 12 and the working fluid in the gas turbine 110.

Figure 2C:
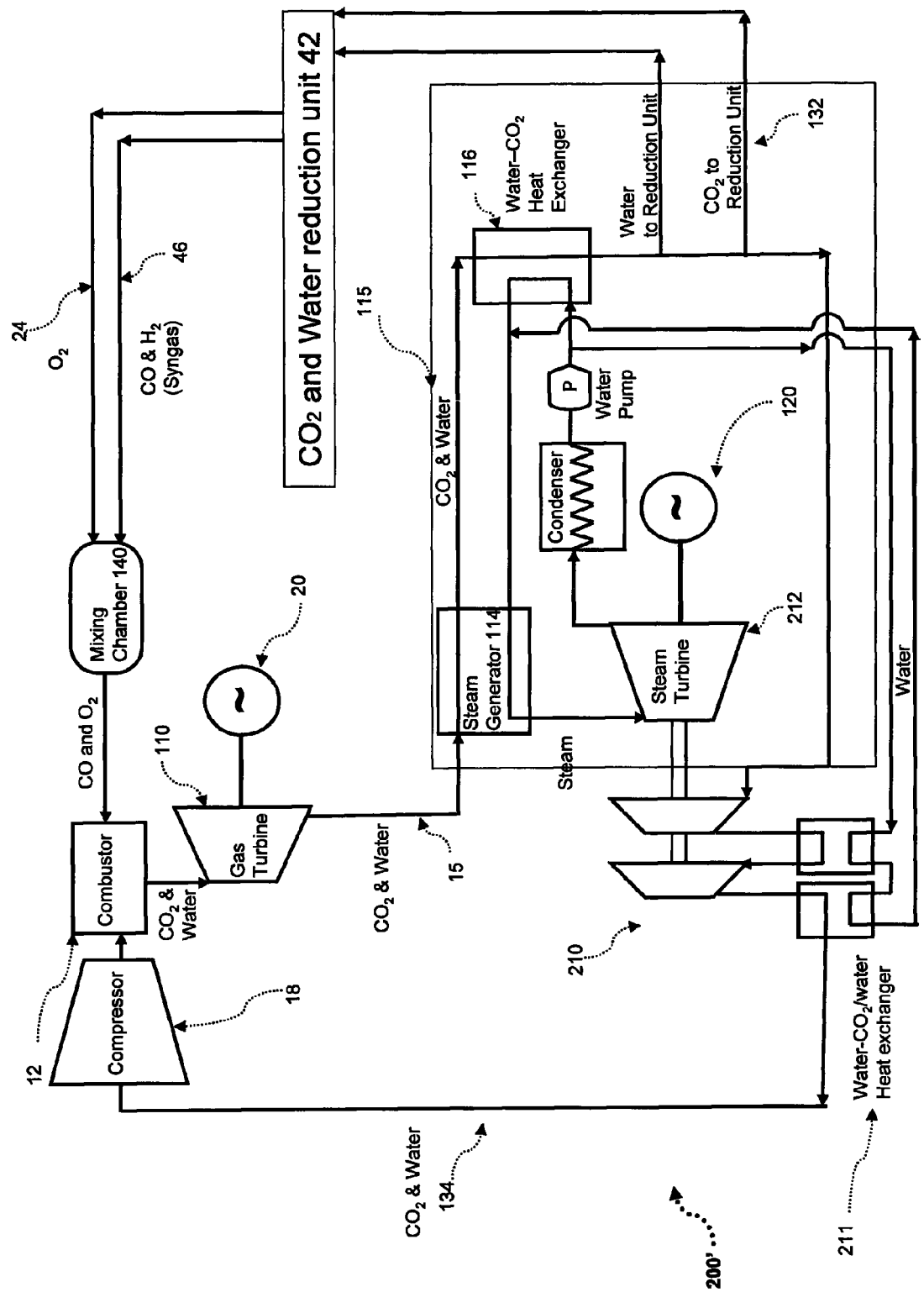

FIG. 2C illustrates a system 200' presenting another specific but not limiting example of the configuration of system 40 of FIG. 2A. The system 200' differs from the above-described system 200 of FIG. 2B in that system 200' includes an intercooled $CO_2$ & water compressor 210 connected to and driven by a steam turbine 212. A heat exchanger 211 cools the $CO_2$ and water mixture and preheats water prior to its introduction into the steam generator 114 using the waste heat generated during the $CO_2$ and water compression in 210 (similar to the example of FIG. 1D). It assists heat exchanger 116, while improving the efficiency of compressor 210. All the other constructional and operational details of system 200' are similar to the above-described system 200.

Figure 3:
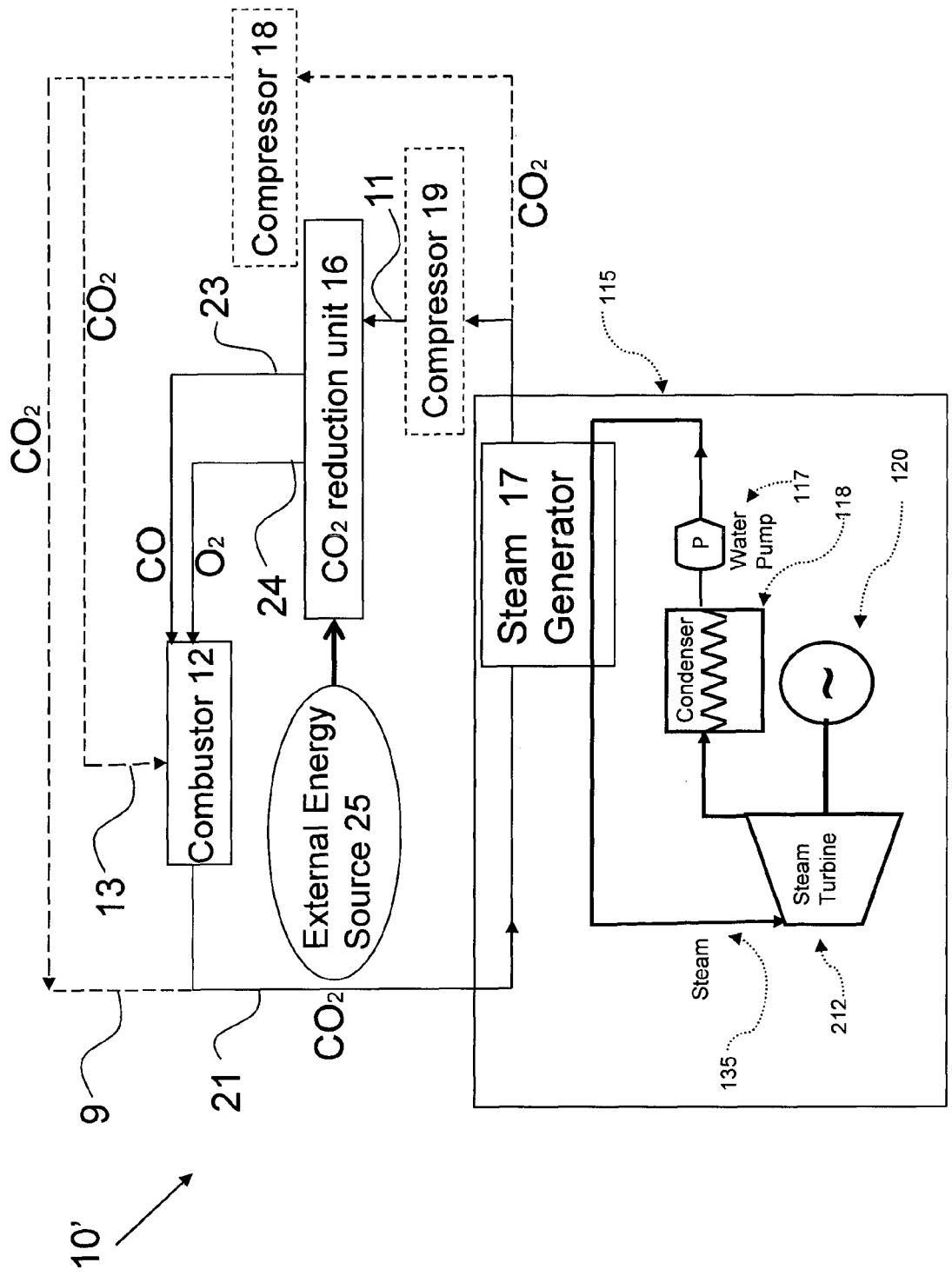
FIG. 3 schematically illustrates a block diagram of a system of the present invention configured for operating a steam cycle, which powers a steam turbine.

Reference is made to FIG. 3 illustrating a schematic block diagram of a system 10' being generally similar to the system 10 shown in FIGS. 1A-1B, but in this example the heated $CO_2$ 21 coming out of combustor 12 is used to drive a steam-Rankine cycle 115. The hot, compressed stream of $CO_2$ exiting the combustor 12 is introduced into a steam Rankine cycle 115, comprising a heat recovery unit (HRU) configured as a steam generator 17. The compressor 19 may be fed by a portion or all of the $CO_2$ outputted by the HRU. In this specific example, the HRU comprises a steam generator 17 utilizing the heat of the $CO_2$ to generate steam 135. The steam generated and possibly also superheated in steam generator 17 is used to power the steam turbine 212, which drives an electric generator 120 and produces electricity. The exhaust steam from the turbine 212 is condensed in condenser 118 and pumped via a pump 117 (e.g. water pump). The waste heat from the $CO_2$ coming out of the steam generator 17 is used to heat the pumped water. This configuration could be used, for example, for retrofitting existing power plants, where part or all of the fuel (e.g. coal) being combusted there, is replaced with the clean energy source (e.g. solar energy) used in the $CO_2$ reduction process.

The example of FIG. 3 relates to a cycle in which $CO_2$ working gas is reduced to CO fuel and $O_2$, and then formed again by oxy-fuel combustion of the CO fuel. It should be noted that the system 10' would also work with a cycle in which a $CO_2$-and-water working gas is reduced to a syngas fuel and $O_2$, which are then recombined by combustion to yield the $CO_2$-and-water working gas. Such a cycle is described in FIGS. 2A, 2B and 2C.

Figure 4A:
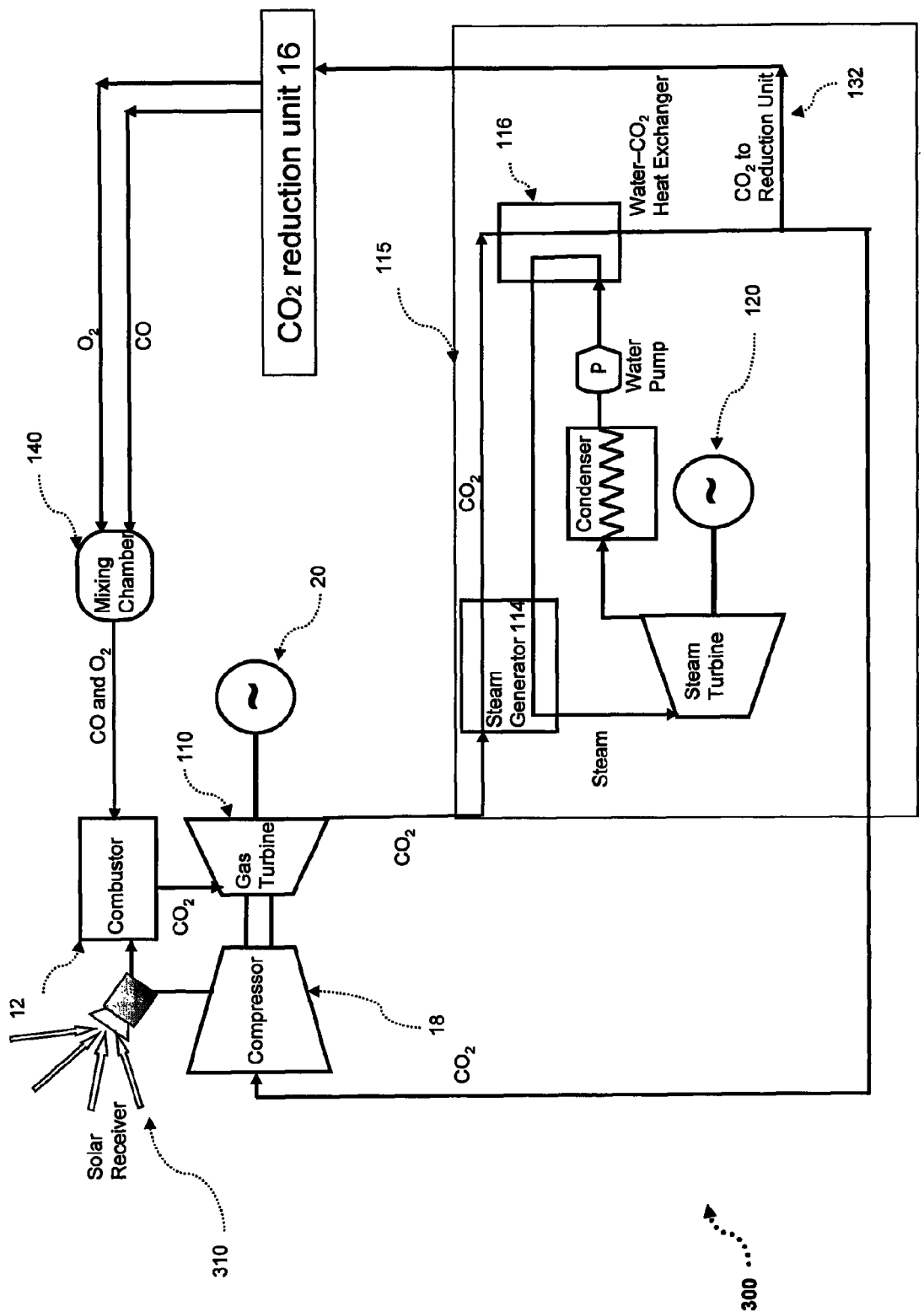
FIGS. 4A, 4B, and 5 to 9 schematically illustrate block diagrams of different possible configurations of systems according to the present invention.

Reference is made to FIG. 4A illustrating a schematic block diagram of another configuration of a part of the system, generally designated 300. In the example of FIG. 4A, a solar receiver 310 is shown being used for preheating the $CO_2$ introduced into the combustor 12. The solar receiver 310 is connected to the output of the compressor 18 and to the inlet of the combustor 12 and is used to preheat the compressed gas before its introduction into the combustor 12. The solar receiver 310 may be any typical solar receiver known in the art.

Although not specifically shown, the same solar receiver or another solar receiver may be connected to the $CO_2$ reduction unit 16, which comprises a solar energy driven $CO_2$ dissociation reactor.

The system 300 thus includes a combustor 12, a gas turbine 110, a compressor 18 associated with the gas turbine 110, a mixing chamber 140, a steam Rankine bottoming cycle 115 and at least one solar receiver 310.

Figure 4B:
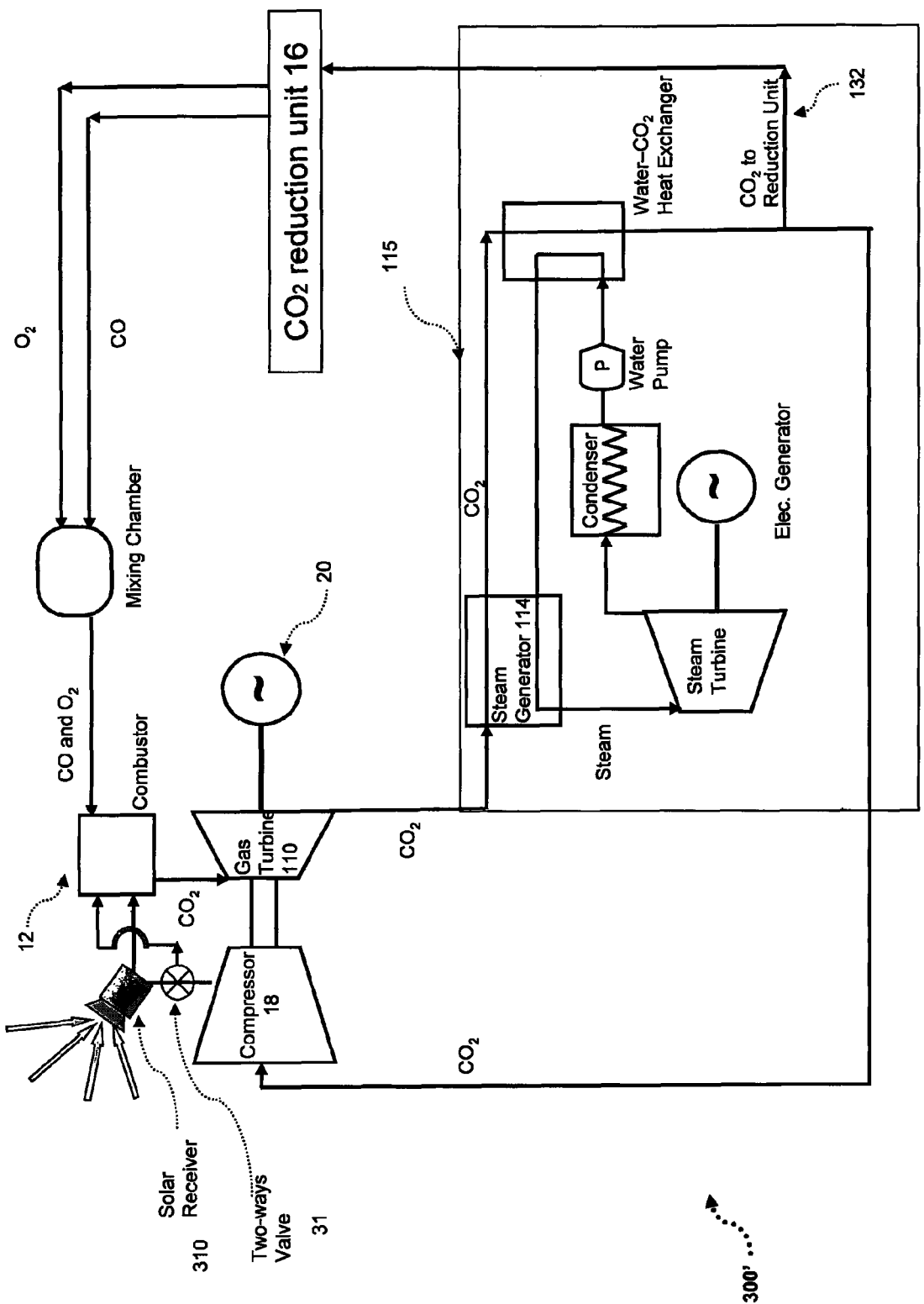

Reference is made to FIG. 4B illustrating a schematic block diagram of another configuration of a part of the system, generally designated 300'. System 300' differs from system 300 (FIG. 4A) in that the solar receiver 310 is connected to combustor 12 in parallel. A flow control unit such as a two-port valve 31 is used, which is connected on one hand to the inlet of the combustor 12 and on the other hand to the outlet of the compressor 18 to control the portions of the flow directed to either the solar receiver 310 or the combustor 12. These portions can be determined based on the availability of solar power. Furthermore, these portions may be selected according to a need to heat the $CO_2$ entering the combustor 12 in order to affect the temperature of the $CO_2$ working gas introduced into the gas turbine 110. In such a case, a temperature sensor (not illustrated) can be placed within the combustor 12 or at the combustor's outlet, in order to measure the temperature of the $CO_2$ exhausted from the combustor 12. The operation of the valve 31 can therefore be controlled according to the temperature measured by the temperature sensor. If the temperature of $CO_2$ exhausted from the combustor 12 is higher than the desired temperature (or a desired temperature range), then the valve can be controlled to increase the direct $CO_2$ flow into the combustor and decrease the $CO_2$ flow to the solar receiver 310, in order to introduce cooler $CO_2$ into the combustor 12. Conversely, if the temperature of $CO_2$ exhausted from the combustor 12 is lower than the desired temperature (or a desired temperature range), then the valve can be controlled to decrease the direct $CO_2$ flow into the combustor and increase the $CO_2$ flow to the solar receiver 310, in order to introduce heated $CO_2$ into the combustor 12. The operation of the valve 31 may be conducted by a user and/or automatically being effected by a suitably preprogrammed control system (not illustrated). As described above, such a control system includes an input port connected to the temperature sensor for receiving therefrom data indicative of the $CO_2$ temperature leaving the combustor 12; a memory utility; a processing utility configured for processing and analyzing measured data to determine its relation to the desired temperature conditions (desired temperature value or a desired temperature range), for determining the extent of the portions of the $CO_2$ flow that should be directed to the solar receiver 310 and the combustor 12 in order to ensure that the temperature of the $CO_2$ leaving the combustor satisfies a predetermined condition, and for generating a control signal indicative of the results; and a controller/manipulating unit, configured for receiving the control signal from the processing unit, and manipulating the valve 31 accordingly, in order to direct the appropriate portions to the solar receiver 310 and the combustor 12.

Figure 5:
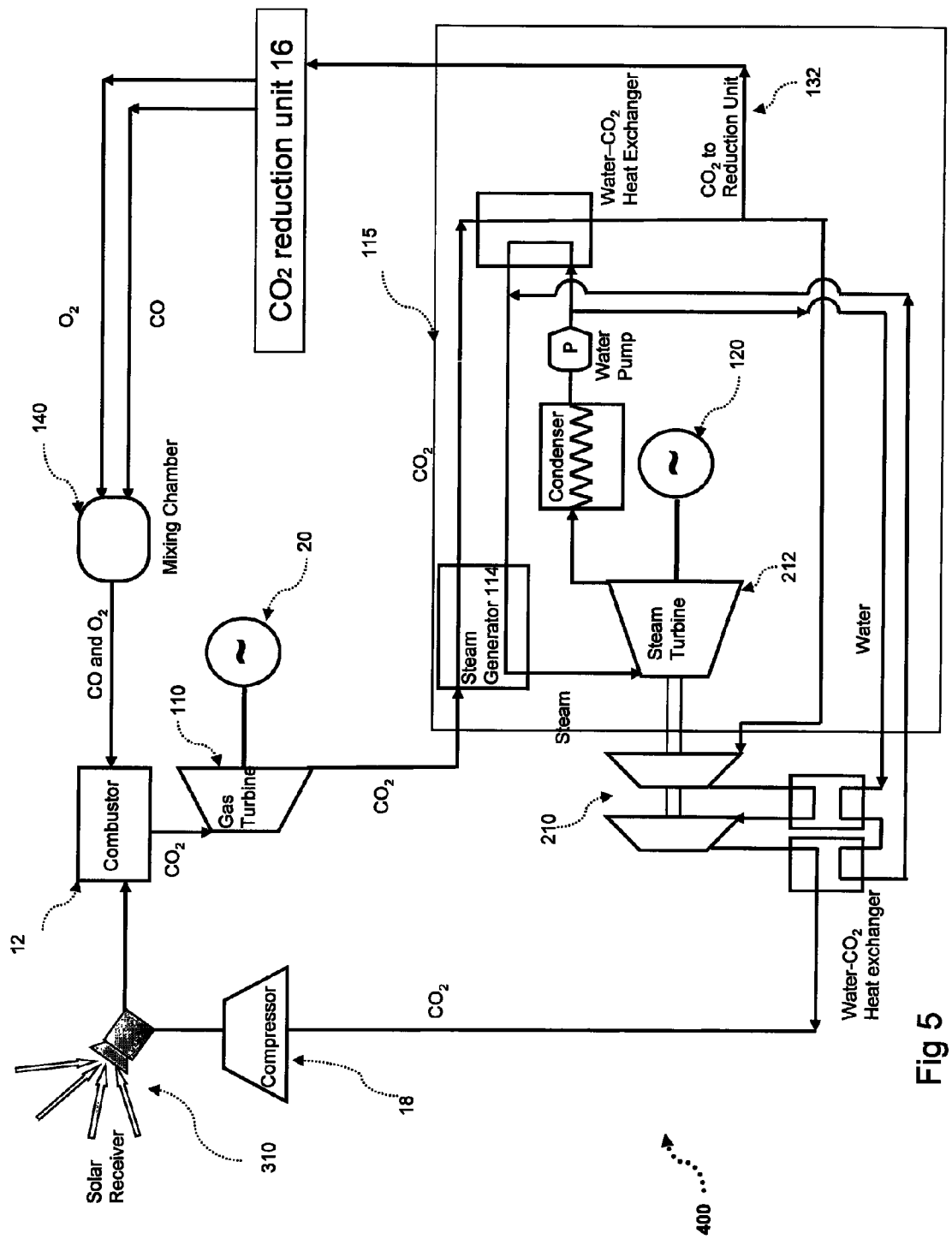

Reference is made to FIG. 5 illustrating a schematic block diagram of another configuration of a part of the system, generally designated 400. System 400 differs from the above-described system 200 (FIG. 1D) in its use of a solar receiver 310 for preheating the $CO_2$ introduced into the combustor 12. The system 400 thus includes a solar receiver 310, a combustor 12, a gas turbine 110, a compressor 18 associated with the gas turbine 110, an intercooled compressor 210 associated with a steam turbine 212, a mixing chamber 140, and a steam Rankine bottoming cycle 115 comprising a stem generator 114 and a steam turbine 212.

Figure 6:
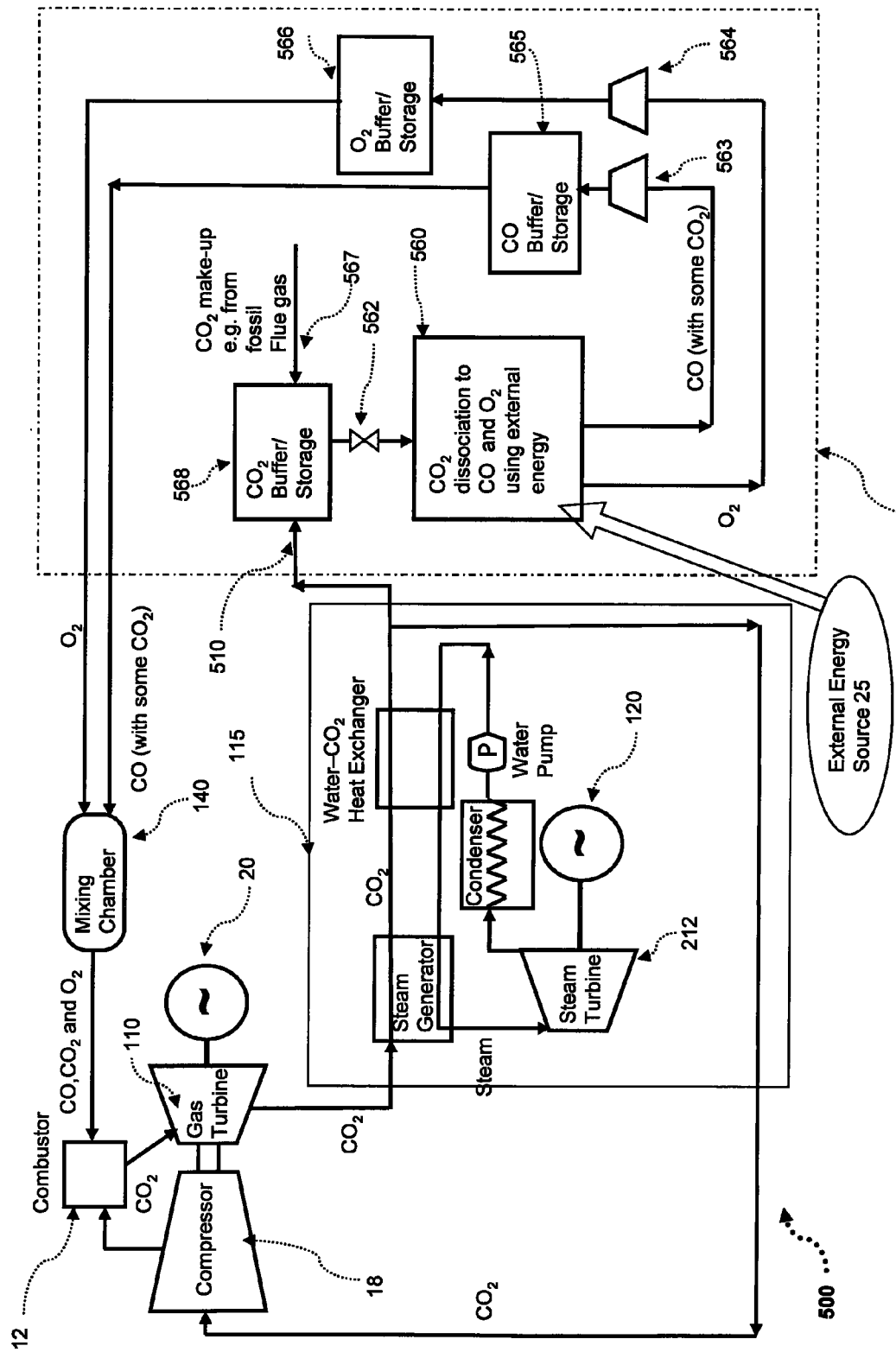

Reference is made to FIG. 6 illustrating a schematic block diagram of yet another configuration of the system, generally designated 500. System 500 comprises a $CO_2$ reduction unit 16, powered by an external energy source 525 (e.g. solar energy). The $CO_2$ reduction unit 16 operates as a recycling module converting $CO_2$ into CO and $O_2$ in reactor 560. The $CO_2$ introduced into reactor 560 comes from a buffer storage tank 568 via a flow regulator 562. The buffer storage tank 568 is fed by the $CO_2$ used for heating the steam Rankine bottoming cycle via an inlet 510 and optionally from a makeup $CO_2$ source such as stream from fossil fuel plants via an inlet 567. The $O_2$ outlet from reactor 560 is compressed by compressor 564 and stored in an $O_2$ buffer storage tank 566 which regulates the $O_2$ flow into the mixing chamber 140. The CO outlet from reactor 560 is compressed by compressor 563 and stored in a CO buffer storage tank 565 which regulates the CO flow into the mixing chamber 140. The time and duration in which the turbine 110 is required to operate might be different from the period in which the $CO_2$ reduction unit 16 operates. The flow regulation by storage tanks for $CO_2$ 568, and/or CO 565 and $O_2$ 566 enables the flow of working gas to the gas turbine 110 to be set at the time and duration required to operate the turbine 110. The $CO_2$ reduction unit 16 is driven by an external energy source 25. Optionally, the external energy source includes a solar energy converter unit that converts solar energy into work and/or electricity that are used to operate the reduction unit 16. Such converter might operate only during solar hours (roughly 8-12 hours a day). In addition, the $CO_2$ reduction unit 16 may also be powered by at least one of the gas turbine 110 and steam turbine 212, enabling operation of the reduction unit 16 e during a different period (e.g. when the availability of sunlight is low). The supply of energy to the reduction unit 16 by the gas turbine 110 and and/or steam turbine 212 may extend for up to 24 hours a day, and may be used either in conjunction with the external energy source, or instead of it.

System 500 implements a closed cycle which reuses the $CO_2$ exhausted from the gas turbine 110 to generate its own fuel. The system 500 thus includes a combustor 12, a gas turbine 110, a compressor 18 associated with the gas turbine 110, a mixing chamber 140, a steam Rankine bottoming cycle 115 and a $CO_2$ reduction unit 16, optionally powered by an external energy source 25 (e.g. solar energy).

Figure 7:
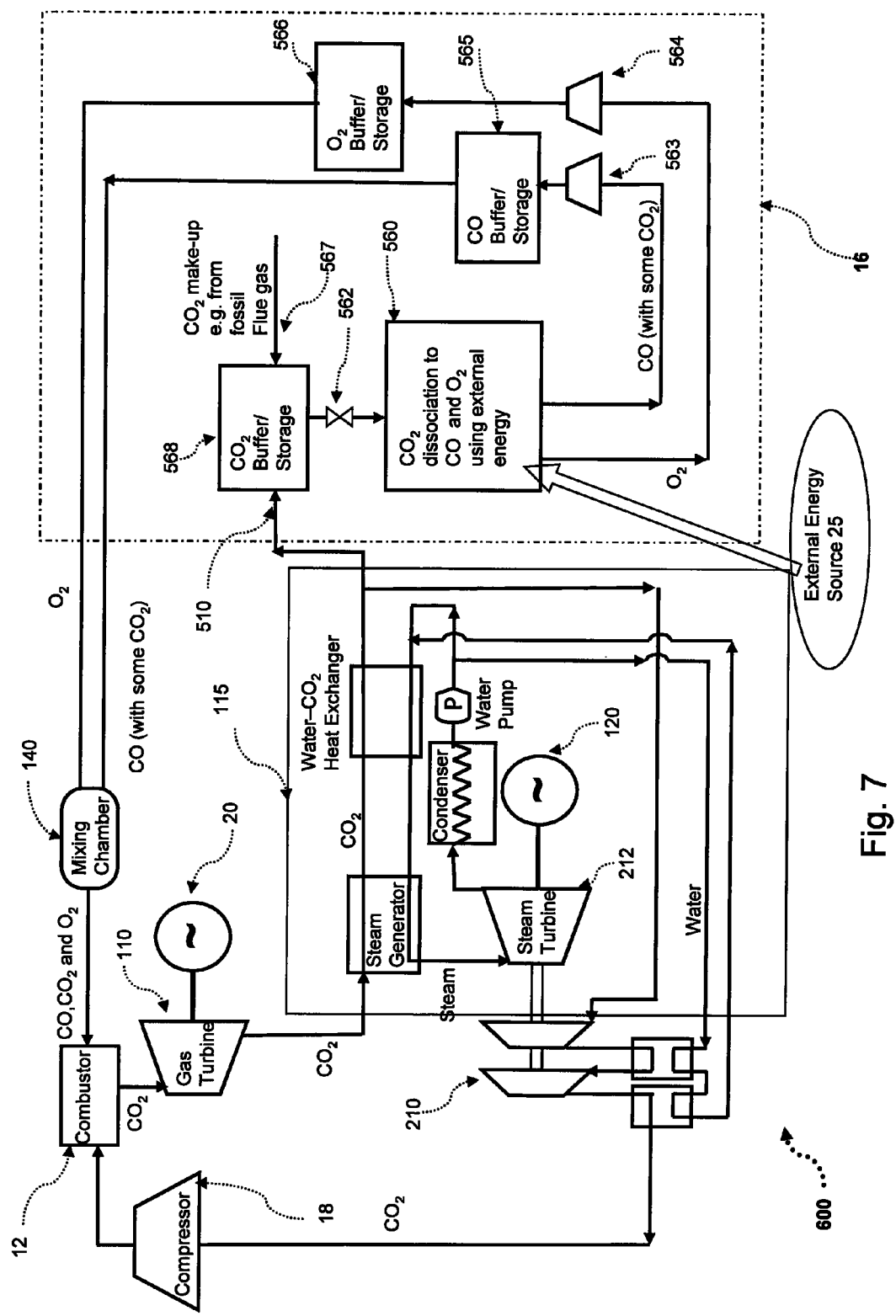

Reference is made to FIG. 7 illustrating a schematic block diagram of yet another configuration of the system, generally designated 600. System 600 differs from the above-described system 500 (FIG. 6) in the introduction of an intercooled $CO_2$ compressor 210 to compress the $CO_2$ fed into the combustor, additionally to the compressor 18, using the same configuration that systems 200 and 400 in FIGS. 1D and 5 respectively. The system 600 thus includes a combustor 12, a gas turbine 110, a compressor 18, an intercooled compressor 210 associated with a steam turbine 212, a mixing chamber 140, a steam Rankine bottoming cycle 115 and a $CO_2$ reduction unit 16, optionally powered by an external energy source 25 (e.g. solar energy).

Figure 8:
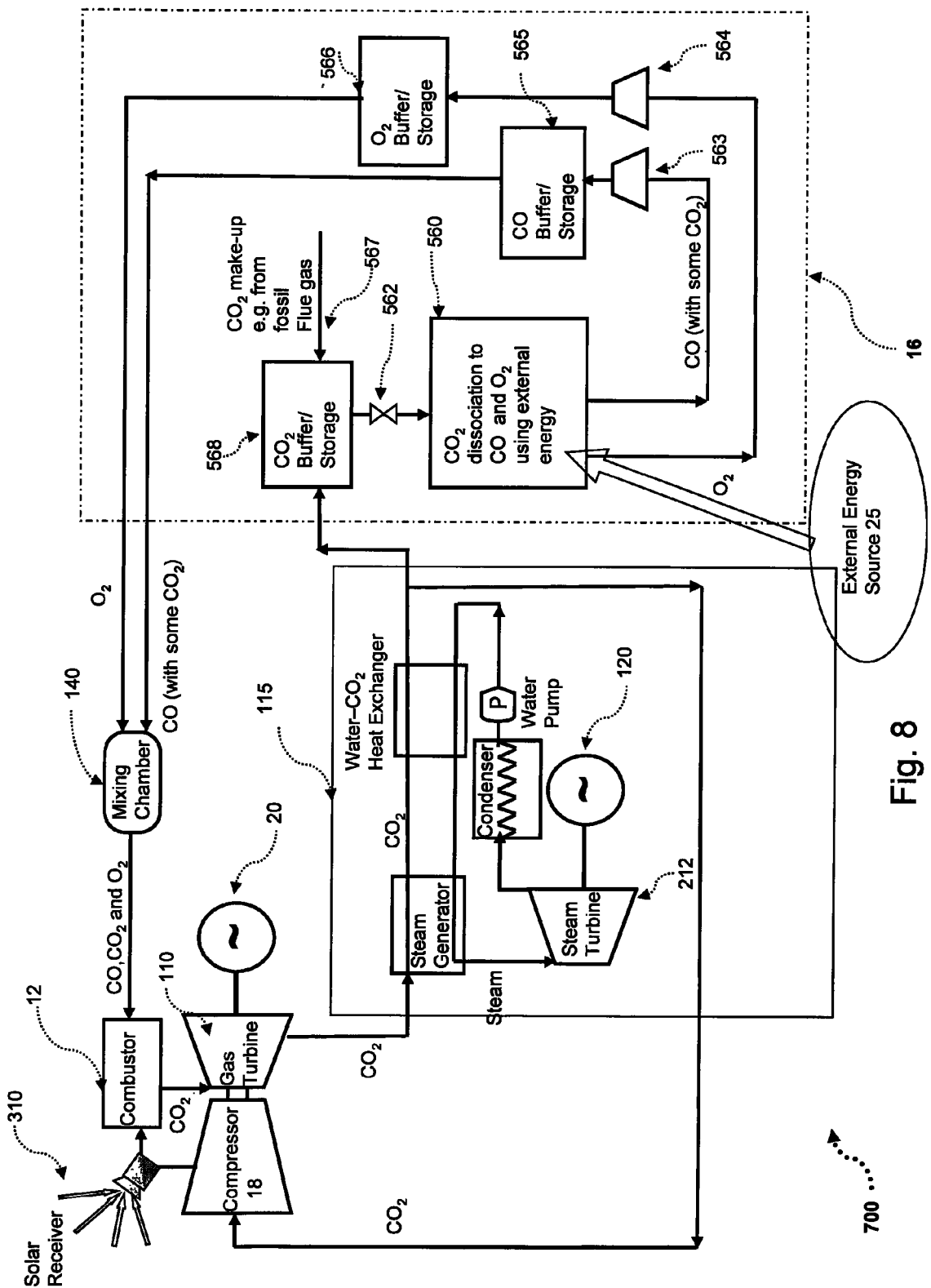

Reference is made to FIG. 8 illustrating a schematic block diagram of yet another configuration of the system, generally designated 700. System 700 differs from system 500 (FIG. 6) in the introduction of a solar receiver 310 which preheats the $CO_2$ prior to its introduction into the combustor 112 using the same configuration that systems 300 and 400 in FIGS. 4A and 5 respectively. The system 700 thus includes a combustor 12, a gas turbine 110, a compressor 18 associated with the gas turbine 110, a mixing chamber 140, a steam Rankine bottoming cycle 115, a solar receiver 310, and a $CO_2$ reduction unit 16, optionally powered by an external energy source 525 (e.g. solar energy).

Figure 9:
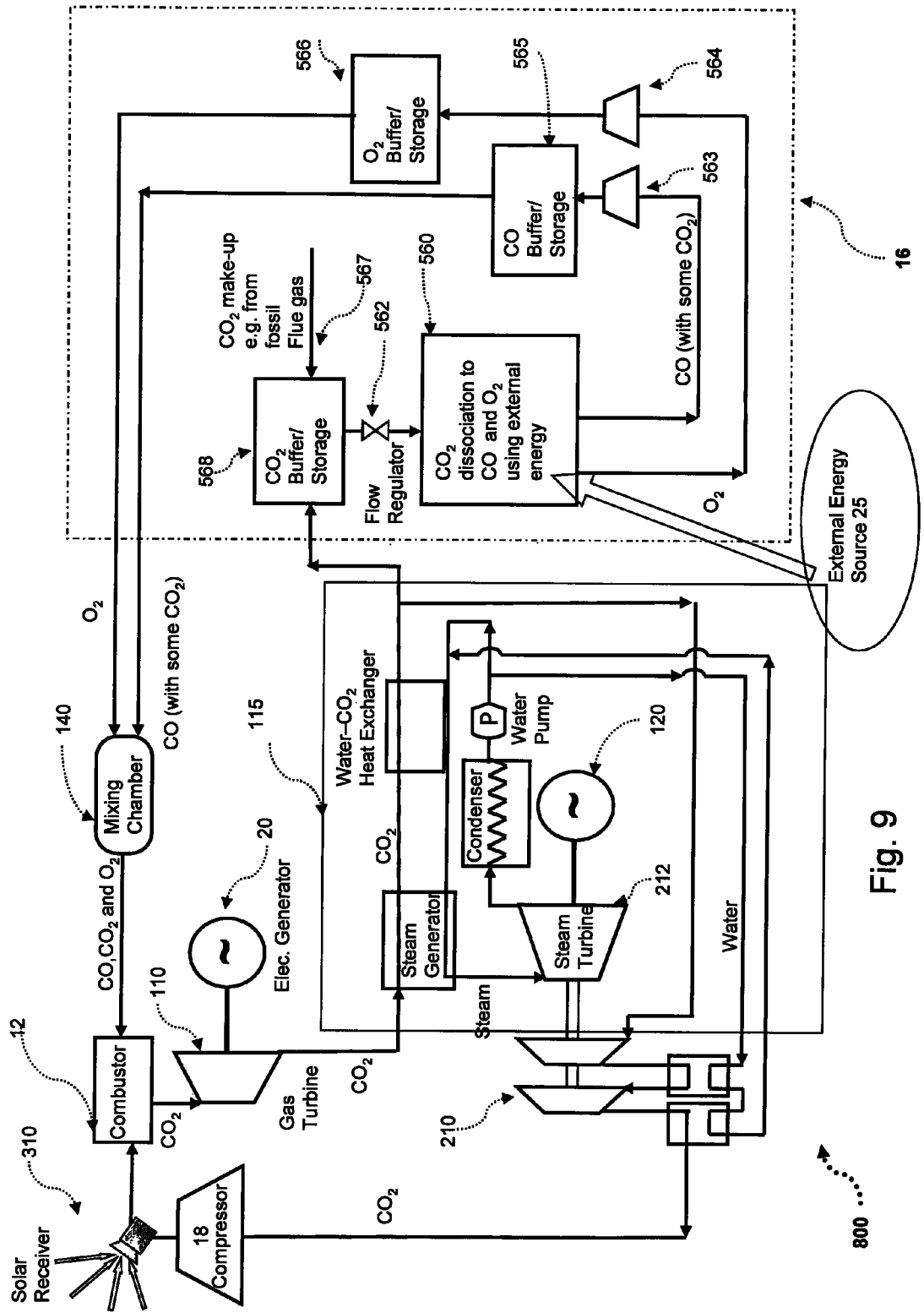

Reference is made to FIG. 9 illustrating a schematic block diagram of another configuration example of a system, generally designated 800. System 800 differs from system 600 (FIG. 7) in the introduction of a solar receiver 310 which preheats the $CO_2$ prior to its introduction into the combustor 112. The system 800 thus includes a combustor 12, a gas turbine 110, an intercooled compressor 210 associated with a steam turbine 212, a mixing chamber 140, a steam Rankine bottoming cycle 115, a solar receiver 810, and a compressor

18, a $CO_2$ reduction unit 550, powered by an external energy source 525 (e.g. solar energy).

In the example of FIGS. 6-9 the system is based on reduction of $CO_2$ into CO and $O_2$ and on the reaction of CO and $O_2$ for yielding $CO_2$. However, it should be noted that the system configurations of FIGS. 6-9 can be modified so that the system is based on reduction of a mixture of $CO_2$ and water or steam into syngas and $O_2$, and on the reaction of syngas and $O_2$ for yielding a mixture of $CO_2$ and water or steam. Such a process is described in detail above, with reference to FIGS. 2A-2C. If the systems of FIGS. 6-9 were thus modified, the buffer storage tank 568 would be configured for storing the mixture of $CO_2$ and water, and possible receiving at least some mixture of $CO_2$ and water via the inlet 567. The reactor 560 would be configured for reducing a mixture of $CO_2$ and water into syngas and $O_2$. The CO storage tank 565 would be configured for storing syngas and regulating the syngas flow into the mixing chamber or combustor.

Figure 10:
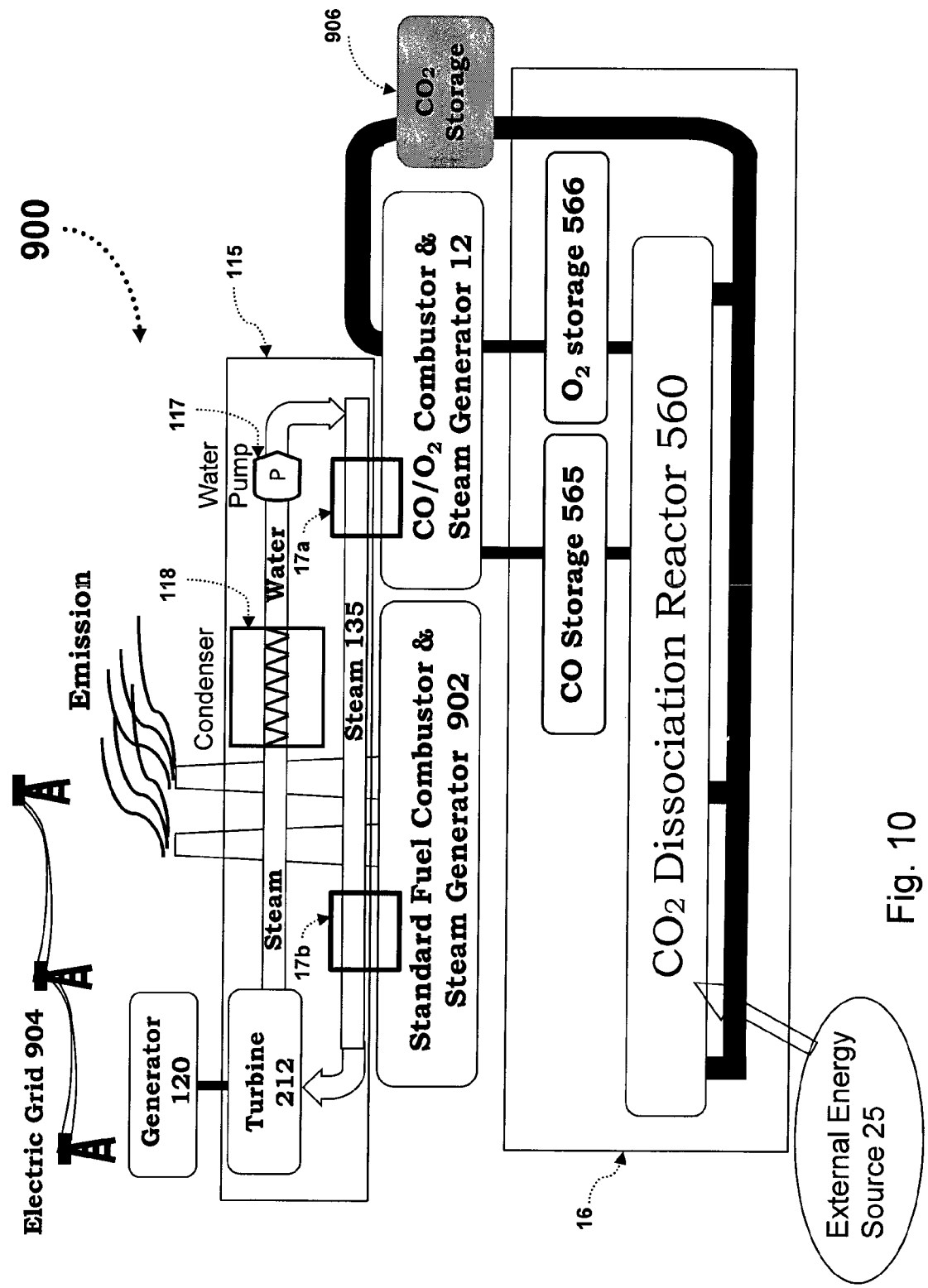
FIG. 10 is a schematic illustration of how the technique of the present invention is used with a power generation plant using Steam-Rankine cycle, where part of the heat for generating and superheating the steam is provided by coal burning in air and the rest of the heat is provided by burning CO with clean $O_2$ (oxy-fuel combustion), both of which are generated from the $CO_2$ reduction unit.

Reference is now made to FIG. 10, which provides one example of how the principles of the invention can be used in a power generation plant 900 using a steam-Rankine cycle. Here, part of the heat for generating and superheating the steam is provided by burning CO with clean $O_2$, both of which are generated in the $CO_2$ dissociation reactor 560, and the rest of the heat is optionally provided by a fuel (for example coal) burning in air.

The power generation plant 900 includes an optionally standard fuel (e.g. coal or natural gas) combustor and steam generator 902, a CO oxy-fuel combustor and steam generator 12, a $CO_2$ storage tank 906, a $CO_2$ reduction unit 16, and a steam-Rankine cycle 115. The power generation plant 900 thus includes a system for operating the first cycle of $CO_2$, CO, and $O_2$ similar to the above-described system 10' of FIG. 3. Other systems for performing a steam-Rankine cycle 115 are described above with reference to FIGS. 1C-1D, 4A-4B, 5-9, and they can also optionally include the fuel combustor 902. The system for operating the first cycle, which includes oxy-fuel combustion of CO to $CO_2$, provides heat to the system for performing the steam-Rankine cycle 115 via an HRU 17a. The standard fuel combustor 902, if present, provides heat to the system for performing the steam-Rankine cycle 115 via an HRU 17b.

The use of the plant 900 decreases (or even eliminates) the need of using fuel (such as coal or natural gas) burning in air. Generally, exhaust stream from a fuel burning in air is primarily a mixture of soot, $N_2$, $O_2$, $CO_2$, $H_2O$ and includes small portions of various harmful by-products such as $SO_2$ and NOx. The soot, $SO_2$ and NOx are usually scrubbed away in the emission stack of the fuel combustor 902. Separation of $CO_2$ from the other mixture components, especially $N_2$ and $O_2$, is a very costly and inefficient process. Oxy-fuel combustion of CO in the combustor 12 produces a nearly clean $CO_2$ stream—No $N_2$ or $NO_x$ is produced; there is considerably less soot and $SO_2$, and their scrubbing is therefore relatively easy. Following the scrubbing, there is no need for separation of $CO_2$ from other exhaust gases. Therefore the part of the combustion in the plant 900 that is oxy-fuel combustion, decreases the emission of harmful products generated by burning a fuel in air.

In the steam-Rankine cycle 115, steam 135 is superheated by heat exchange via HRU 17a between the steam and/or water and hot $CO_2$ generated by the combustor 12, as well as by heat exchange via HRU 17b between the steam 135 and heated combustion products generated by standard fuel combustion in the combustor 902. HRU 17a and 17b may operate in series or in parallel. The steam 135 is then introduced into the turbine 212, which is connected with an electric generator 120, which provides electricity to an electric grid 904. The steam 135 discharges some of its thermal energy in the turbine 212, and is exhausted from the turbine 212 in steam or steam/water mixture form. This mixture is then condensed to 100% liquid water in condenser 118, pumped up to the pressure required by the turbine in water pump 117 and redirected to the HRU 17a and HRU 17b to be heated again. The HRU 17a is similar to the HRU 17 of FIGS. 1A-1B, and may include a steam generator 114 and/or a water-$CO_2$ heat exchanger 116, as mentioned above with reference to FIGS. 1C-1D, 3, 4A-4B, 5-9. As mentioned above, the $CO_2$ reduction unit 16 may be of any known suitable type, e.g. as described in PCT/IL2009000743.

It should be noted that the power plant 900 would also work with a cycle in which a $CO_2$-and-water working gas is reduced to a syngas fuel and $O_2$, which are then recombined by combustion to yield the $CO_2$-and-water working gas. Such a cycle is described above with reference to FIGS. 2A, 2B and 2C.

Figure 11:
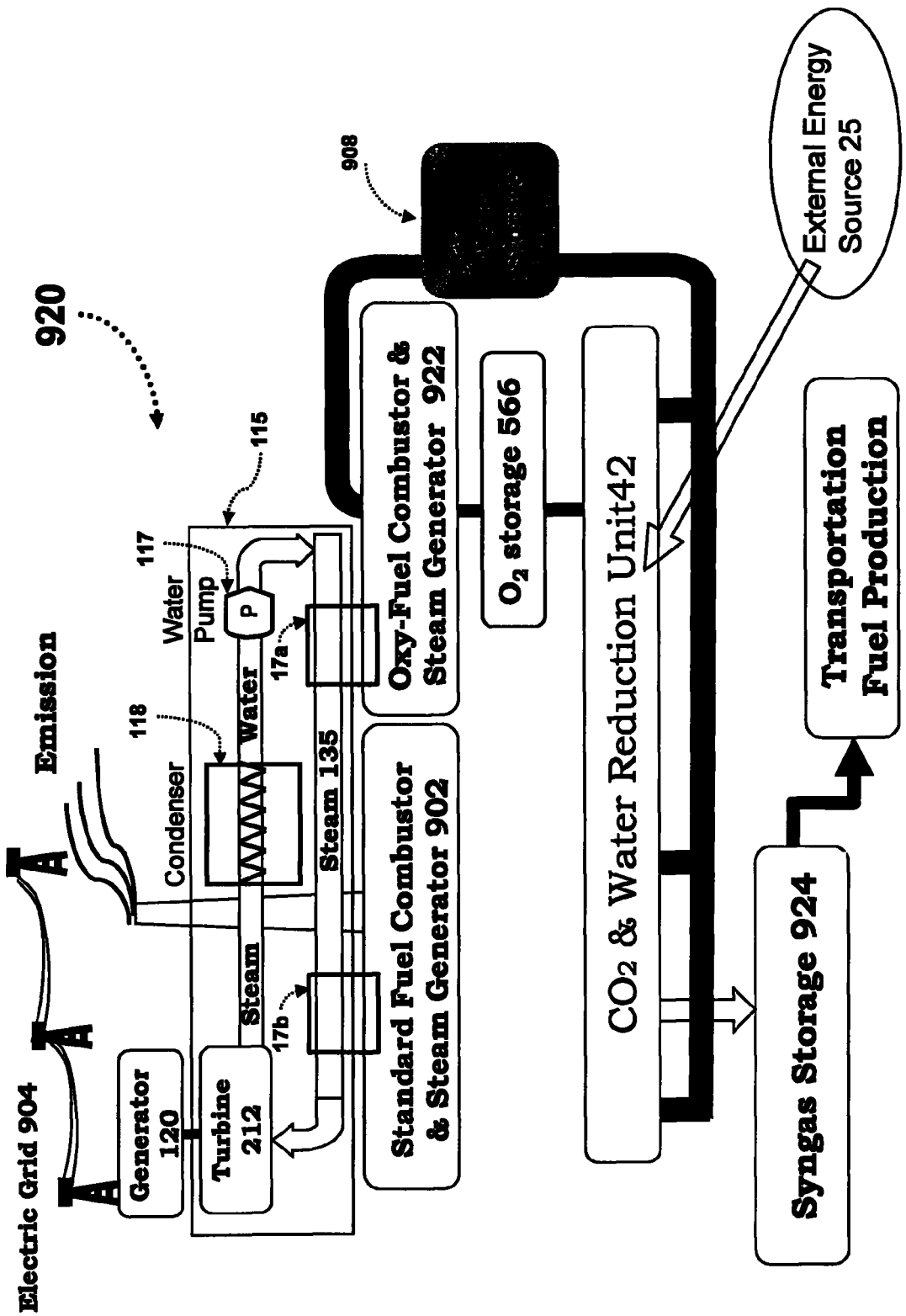
FIG. 11 is a schematic illustration of how the technique of the present invention is used with a power generation plant using Steam-Rankine cycle, where part of the heat for generating and superheating the steam is provided by coal burning in air and the rest is provided by burning coal with clean $O_2$ (oxy-fuel combustion) provided by the $CO_2$ dissociation plant.

Reference is now made to FIG. 11, illustrating an example of the use of the principles of the present invention in power generation plant 920 utilizing a steam-Rankine cycle. In the plant 920, part, or all of the heat for generating and superheating the steam is provided by burning fuel (such a coal) in an oxy-fuel combustor 922 with clean (purity of about 90% or higher) $O_2$, which is produced in the $CO_2$ and water dissociation plant Optionally, the rest of the heat is provided, in series or parallel, by burning fuel (e.g. coal or natural gas) in air in a second, standard fuel combustor 902.

The difference between the plant 920 and the above-described plant 900 of FIG. 10 is in that the $CO_2$ combustor 12 of the plant 900 is replaced by a fuel combustor 922 in plant 920. In the combustor 922, a fuel (such as coal or natural gas) reacts with substantially pure oxygen (oxy-fuel combustion). The fuel is supplied to the combustor from an external reservoir (e.g. coal storage facility, or natural gas storage tank), rather than being produced in a $CO_2$ (or $CO_2$ and water) dissociation reactor. The products of the oxy-fuel combustion is a hot mixture of mostly $CO_2$ and $H_2O$, which transfers its heat to the steam Rankine cycle 115 via HRU 17a (similar to HRU 17 described above). The $CO_2$ and water are then directed to a $CO_2$-and-water reduction unit 42 (described in FIGS. 2A-2C), where dissociation into syngas (a mixture of CO and $O_2$) and $O_2$ is performed. $CO_2$ and water storage 908 can be used to control the flow of $CO_2$ and water to reduction unit 42. Following the dissociation process in the reduction unit 42, the oxygen is transferred to an $O_2$ storage tank 566 for use in oxy-fuel combustion of the fuel (e.g. coal) in the fuel combustor 922. The mixture of CO and $H_2$ produced in the reduction unit 42 is sent to a syngas storage tank 924 for further use in other applications such as production of another fuel—for example, a liquid fuel for transportation (e.g. methanol, diesel, or kerosene-based aviation fuel). Similar to plant 900 of FIG. 10, the use of the plant 920 also decreases the emission of harmful products generated by burning a fuel in air because at least part of the combustion in the plant 920 is oxy-fuel combustion.

Thus, the present invention provides a novel and effective power generation system, which can be used in various applications. Those skilled in the art will readily appreciate that various modifications and changes can be applied to the embodiments of the invention as hereinbefore described without departing from its scope defined in and by the appended claims.

The invention claimed is:

1. An energy generation system for use in operating a heat engine, the system comprising:
   a reduction unit energized by an external energy source and being configured and operable for reducing $CO_2$ into CO and $O_2$, said $CO_2$ reduction unit having a gas inlet associated with a gas outlet of the heat engine for inputting $CO_2$, and having CO and $O_2$ gas outlets, and
   a combustor comprising a plurality of gas inlets including gas inlets connected to the outlets of said reduction unit for receiving the CO and $O_2$ gases, and a gas inlet for receiving a $CO_2$ working fluid, and a gas outlet connectable to a gas inlet of the heat engine, said combustor being configured and operable to cause a reaction between said CO and $O_2$ gases thereby combusting the CO gas to form $CO_2$ gas, and for supplying, through said gas outlet, a substantially pure $CO_2$ gas to drive the heat engine,
   the energy generation system thereby providing operation of the heat engine driven by said external energy source via the reduction of $CO_2$.

2. The energy generation system of claim 1, wherein said combustor further comprises an additional inlet associated with said gas outlet of the heat engine and configured for receiving at least a portion of said $CO_2$ exhausted by the heat engine.

3. The energy generation system of claim 1, further comprising a conduit that bypasses said combustor while conveying $CO_2$ directly to a gas inlet of the heat engine.

4. The energy generation system of claim 1 wherein the system is configured as combined cycle, wherein said combined cycle comprises a first cycle and a second cycle, said first cycle comprising a heat engine and said second cycle comprising a Rankine turbine.

5. The energy generation system of claim 1, wherein the system is configured as a combined cycle, wherein said combine cycle comprises a first cycle and a second cycle, said second cycle comprises a heat recovery unit (HRU) connected to the heat engine outlet and having at least one $CO_2$ inlet and one $CO_2$ outlet, said HRU being configured and operable for transferring at least some heat from $CO_2$ exhausted by the heat engine to a fluid circulating in the second cycle.

6. The system of claim 1, wherein:
   said reduction unit is configured and operable for reducing a mixture of $CO_2$ and water or steam into $O_2$ and syngas (a mixture of CO and $H_2$);
   said combustor is configured and operable for reaction between syngas and $O_2$ yielding the mixture of $CO_2$ and water-steam; and
   said heat engine is driven by the gas output from said combustor comprising said mixture of $CO_2$ and water-steam.

7. The energy generation system of claim 1, wherein said reduction unit comprises:
   a buffer storage module for receiving from an HRU, a fluid being $CO_2$ or a mixture of $CO_2$ and steam or water;
   a reduction reactor configured and operable to receive said fluid from said buffer storage module and to reduce $CO_2$ into CO and $O_2$ or said mixture of $CO_2$ and steam or water into syngas and $O_2$;
   a flow regulator regulating the fluid flow from said buffer storage module to said reduction reactor;
   a first compressor configured and operable to compress CO or syngas leaving said reduction reactor and to supply compressed CO or syngas to said combustor, and a second compressor configured and operable to compress $O_2$ leaving said reduction reactor and to supply compressed $O_2$ to said combustor.

8. A power plant for generating electricity, comprising:
   a steam cycle comprising a steam turbine having an inlet for receiving high-temperature steam and an outlet for exhausting stream and/or water having lower temperature and pressure than the high-temperature steam, the steam turbine being powered by passage of steam therethrough;
   the energy generation system of claim 1, for transferring at least some heat from said combustor's exhaust to said water and/or steam exhausted by said heat engine being a steam turbine, thereby powering said steam cycle and driving the steam turbine; and
   an electric generator associated with said steam turbine and configured for using work generated by said steam turbine to generate electricity.

9. A method for use in operating a heat engine, the method comprising:
   (a) reducing a $CO_2$ gas into CO and $O_2$ gases;
   (b) reacting said CO and $O_2$ gases, thus combusting the CO gas, and yielding a substantially pure $CO_2$ outlet gas;
   (c) supplying said $CO_2$ outlet gas to the heat engine as a working gas in its heat-to-work generation process.

10. The method of claim 9, further comprising:
    (d) directing $CO_2$ gas exhausted by the heat engine to a reduction unit for further reduction; and
    (e) repeating the preceding steps;
    whereby the method is configured to enable generating a closed-loop cycle of the heat engine operation by reusing the $CO_2$ exhausted from the heat engine to produce CO and $O_2$.

11. The method of claim 9, further comprising conveying $CO_2$ gas to a gas inlet of the heat engine, while bypassing a combustor wherein said CO is combusted to yield a substantially pure $CO_2$ outlet gas.

12. The method of claim 9, wherein reducing $CO_2$ into CO and $O_2$ is performed by using additional $CO_2$ gas supplied from an external source.

13. The method of claim 9, wherein:
    a mixture of $CO_2$ and water or steam is reduced to syngas (a mixture of CO and $H_2$) and separated $O_2$;
    syngas reacts with $O_2$ yielding a mixture of $CO_2$ and water;
    said mixture of $CO_2$ and water or steam is supplied to the heat engine; and
    the mixture of $CO_2$ and water or steam exhausted from the heat engine is directed to the said reduction unit for further reduction.

* * * * *